United States Patent
Luders et al.

(10) Patent No.: US 11,249,182 B2
(45) Date of Patent: *Feb. 15, 2022

(54) METHODS AND SYSTEMS FOR CLEARING SENSOR OCCLUSIONS

(71) Applicant: Waymo LLC, Mountain View, CA (US)

(72) Inventors: Brandon Douglas Luders, Sunnyvale, CA (US); Tim Campbell, Los Angeles, CA (US); Nathaniel Fairfield, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 97 days.

This patent is subject to a terminal disclaimer.

(21) Appl. No.: 16/143,316

(22) Filed: Sep. 26, 2018

(65) Prior Publication Data
US 2019/0018131 A1 Jan. 17, 2019

Related U.S. Application Data

(63) Continuation of application No. 14/919,667, filed on Oct. 21, 2015, now Pat. No. 10,267,908.

(51) Int. Cl.
*G01S 13/04* (2006.01)
*G01S 13/86* (2006.01)
(Continued)

(52) U.S. Cl.
CPC .......... *G01S 13/865* (2013.01); *G01S 7/4026* (2013.01); *G01S 7/4972* (2013.01); *G01S 13/04* (2013.01);
(Continued)

(58) Field of Classification Search
CPC ...... G01S 13/04; G01S 13/865; G01S 13/931; G01S 17/026; G01S 17/936; G01S 7/4026; G01S 7/4972
See application file for complete search history.

(56) References Cited

U.S. PATENT DOCUMENTS 8,473,171 B2 6/2013 Zagorski
8,605,947 B2 12/2013 Zhang et al.
(Continued)

FOREIGN PATENT DOCUMENTS

DE 101 49 115 4/2003
DE 10 2005 009702 9/2006
(Continued)

OTHER PUBLICATIONS

International Search Report and Written Opinion of corresponding International Application No. PCT/US2016/057562 (dated Jan. 31, 2017).
(Continued)

*Primary Examiner* — Timothy A Brainard
(74) *Attorney, Agent, or Firm* — McDonnell Boehnen Hulbert & Berghoff LLP

(57) ABSTRACT

A method is provided that involves identifying a target region of an environment of an autonomous vehicle to be monitored for presence of moving objects. The method also involves operating a first sensor to obtain a scan of a portion of the environment that includes at least a portion of the target region and an intermediate region between the autonomous vehicle and the target region. The method also involves determining whether a second sensor has a sufficiently clear view of the target region based on at least the scan obtained by the first sensor. The method also involves operating the second sensor to monitor the target region for presence of moving objects based on at least a determination that the second sensor has a sufficiently clear view of the target region. Also provided is an autonomous vehicle configured to perform the method.

24 Claims, 11 Drawing Sheets

(51) Int. Cl.
| | |
|---|---|
| *G01S 17/10* | (2020.01) |
| *G01S 17/42* | (2006.01) |
| *G01S 17/87* | (2020.01) |
| *G01S 13/87* | (2006.01) |
| *G01S 17/04* | (2020.01) |
| *G01S 17/86* | (2020.01) |
| *G01S 17/931* | (2020.01) |
| *G01S 7/40* | (2006.01) |
| *G01S 7/497* | (2006.01) |
| *G01S 13/931* | (2020.01) |

(52) U.S. Cl.
CPC ............ *G01S 13/87* (2013.01); *G01S 13/931* (2013.01); *G01S 17/04* (2020.01); *G01S 17/10* (2013.01); *G01S 17/42* (2013.01); *G01S 17/86* (2020.01); *G01S 17/87* (2013.01); *G01S 17/931* (2020.01); *G01S 7/4039* (2021.05); *G01S 2013/93271* (2020.01); *G01S 2013/93272* (2020.01); *G01S 2013/93273* (2020.01); *G01S 2013/93274* (2020.01)

(56) References Cited

U.S. PATENT DOCUMENTS

| | | | |
|---|---|---|---|
| 8,712,624 | B1 | 4/2014 | Ferguson et al. |
| 9,069,080 | B2 | 6/2015 | Stettner et al. |
| 9,164,511 | B1 | 10/2015 | Ferguson et al. |
| 10,267,908 | B2* | 4/2019 | Luders .................... G01S 17/87 |
| 2005/0062615 | A1 | 3/2005 | Braeuchle et al. |
| 2006/0267830 | A1* | 11/2006 | O'Boyle ............... G01S 13/931 342/70 |
| 2008/0030394 | A1* | 2/2008 | Yoshida ................ H01Q 3/247 342/74 |
| 2009/0132161 | A1* | 5/2009 | Akita ................. G01C 21/3647 701/532 |
| 2010/0063736 | A1 | 3/2010 | Hoetzer |
| 2010/0235129 | A1 | 9/2010 | Sharma et al. |
| 2012/0194674 | A1 | 8/2012 | Reinpoldt et al. |
| 2012/0310466 | A1 | 12/2012 | Fairfield et al. |
| 2013/0027240 | A1* | 1/2013 | Chowdhury .......... G01S 13/931 342/94 |
| 2013/0151135 | A1 | 6/2013 | Aubrey et al. |
| 2013/0265424 | A1 | 10/2013 | Zhang et al. |
| 2013/0321627 | A1 | 12/2013 | Turn, Jr. et al. |
| 2014/0172290 | A1* | 6/2014 | Prokhorov ............. G01C 21/28 701/408 |
| 2015/0081156 | A1* | 3/2015 | Trepagnier ........... G05D 1/0248 701/26 |
| 2015/0293216 | A1* | 10/2015 | O'Dea .................... G01S 13/87 701/23 |
| 2015/0293532 | A1* | 10/2015 | Gilliland ............... G01S 7/4813 701/28 |
| 2016/0003938 | A1* | 1/2016 | Gazit ...................... G01S 13/02 342/81 |
| 2016/0231746 | A1* | 8/2016 | Hazelton ............... G01S 13/867 |
| 2016/0280264 | A1* | 9/2016 | Baek .................. G06K 9/00805 |

FOREIGN PATENT DOCUMENTS

| | | |
|---|---|---|
| DE | 10 2005 013146 | 9/2006 |
| EP | 2 503 357 | 9/2012 |
| JP | H0651904 U | 7/1994 |
| JP | H11258339 A | 9/1999 |
| JP | 2001063500 A | 3/2001 |
| JP | 2005-505074 A | 2/2005 |
| JP | 2008009929 A | 1/2008 |
| JP | 2008129899 A | 6/2008 |
| JP | 2014182590 A | 9/2014 |
| WO | 2015068249 A1 | 5/2015 |

OTHER PUBLICATIONS

Enric Galceran et al., "Augmented Vehicle Tracking under Occlusions for Decision-Making in Autonomous Driving," 2015 IEEE/RSJ International Conference on Intelligent Robots and Systems (IROS), Sep. 30, 2015, pp. 1-7, IEEE, Hamburg, Germany.

Susan M. Thorton et al., "Multi-sensor Detection and Tracking of Humans for Safe Operations with Unmanned Ground Vehicles," Proceedings on the 1st IEEE Workshop on Human Detection from Mobile Platforms, May 20, 2008, pp. 1-6, IEEE, Pasadena, California, United States of America.

Christoph Mertz et al., "Moving Object Detection with Laser Scanners," Journal of Field Robotics, Jul. 3, 2012, pp. 17-43, vol. 30, Issue 1, Wiley Periodicals, Inc.

Notice of Reasons for Rejection for Japanese Patent Application No. 2018-518604, dated Nov. 5, 2018.

Notice of Reasons for Rejection of Japanese Patent Application No. 2018-518604, dated Feb. 6, 2019.

Notice of Reasons for Rejection of Japanese Patent Application No. 2018-518604, dated May 21, 2019.

The Extended European Supplemental Search Report with Opinion for European Patent Application No. 16858081.9 dated Mar. 14, 2019, pp. 1-10.

* cited by examiner

METHODS AND SYSTEMS FOR CLEARING SENSOR OCCLUSIONS

CROSS-REFERENCE TO RELATED APPLICATION

This application is a continuation of U.S. patent application Ser. No. 14/919,667 filed on Oct. 21, 2015, the entire contents of which are incorporated herein by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

One example sensor is a light detection and ranging (LIDAR) sensor. A LIDAR sensor can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

Another example sensor is a radio detection and ranging (RADAR) sensor. RADAR sensors can be used to actively estimate distances to environmental features by emitting radio signals and detecting returning reflected signals. For example, distances to radio-reflective features can be determined according to the time delay between transmission and reception. Further, for example, a RADAR sensor can emit a signal that varies in frequency over time, such as a signal with a time-varying frequency ramp, and then a system can relate the difference in frequency between the emitted signal and the reflected signal to a range estimate. Some systems may also estimate relative motion of reflective objects based on Doppler frequency shifts in the received reflected signals.

SUMMARY

In one example, a method is provided that involves identifying a target region of an environment of an autonomous vehicle to be monitored for presence of moving objects. The method also involves operating a first sensor on the autonomous vehicle to obtain a scan of a portion of the environment that includes at least a portion of the target region and an intermediate region between the autonomous vehicle and the target region. The method also involves determining, based on at least the scan obtained by the first sensor, whether a second sensor on the autonomous vehicle has a sufficiently clear view of the target region to monitor the target region for presence of moving object. The method also involves operating the second sensor to monitor the target region for presence of moving objects based on at least a determination that the second sensor has a sufficiently clear view of the target region.

In another example, a vehicle is provided that includes a first sensor configured to scan an environment of the vehicle. The vehicle also includes a second sensor configured to scan the environment of the vehicle. The vehicle also includes one or more processors, and data storage configured to store instructions executable by the one or more processors to cause the vehicle to perform functions. The functions include identifying a target region of the environment of the vehicle to be monitored for presence of moving objects. The functions also include operating the first sensor to obtain a scan of a portion of the environment that includes at least a portion of the target region and an intermediate region between the vehicle and the target region. The functions also include determining, based on at least the scan obtained by the first sensor, whether the second sensor has a sufficiently clear view of the target region to monitor the target region for presence of moving objects. The functions also include operating the second sensor to monitor the target region for presence of moving objects based on at least a determination that the second sensor has a sufficiently clear view of the target region.

In yet another example, a non-transitory computer readable medium is provided. The non-transitory computer readable medium may have instructions stored therein that when executed by a computing device, cause the computing device to perform functions. The functions comprise identifying a target region of an environment of an autonomous vehicle to be monitored for presence of moving objects. The functions further comprise operating a first sensor on the autonomous vehicle to obtain a scan of a portion of the environment that includes at least a portion of the target region and an intermediate region between the autonomous vehicle and the target region. The functions further comprise determining, based on at least the scan obtained by the first sensor, whether a second sensor on the autonomous vehicle has a sufficiently clear view of the target region to monitor the target region for presence of moving objects. The functions further comprise operating the second sensor to monitor the target region for presence of moving objects based on at least a determination that the second sensor has a sufficiently clear view of the target region.

In still another example, a system is provided that includes means for identifying a target region of an environment of an autonomous vehicle to be monitored for presence of moving objects. The system also comprises means for operating a first sensor on the autonomous vehicle to obtain a scan of a portion of the environment that includes at least a portion of the target region and an intermediate region between the autonomous vehicle and the target region. The system also comprises means for determining, based on at least the scan obtained by the first sensor, whether a second sensor on the autonomous vehicle has a sufficiently clear view of the target region to monitor the target region for presence of moving objects. The system also comprises means for operating the second sensor to monitor the target region for presence of moving objects based on at least a determination that the second sensor has a sufficiently clear view of the target region.

These as well as other aspects, advantages, and alternatives, will become apparent to those of ordinary skill in the art by reading the following detailed description, with reference where appropriate to the accompanying figures.

DETAILED DESCRIPTION

Figure 1A:
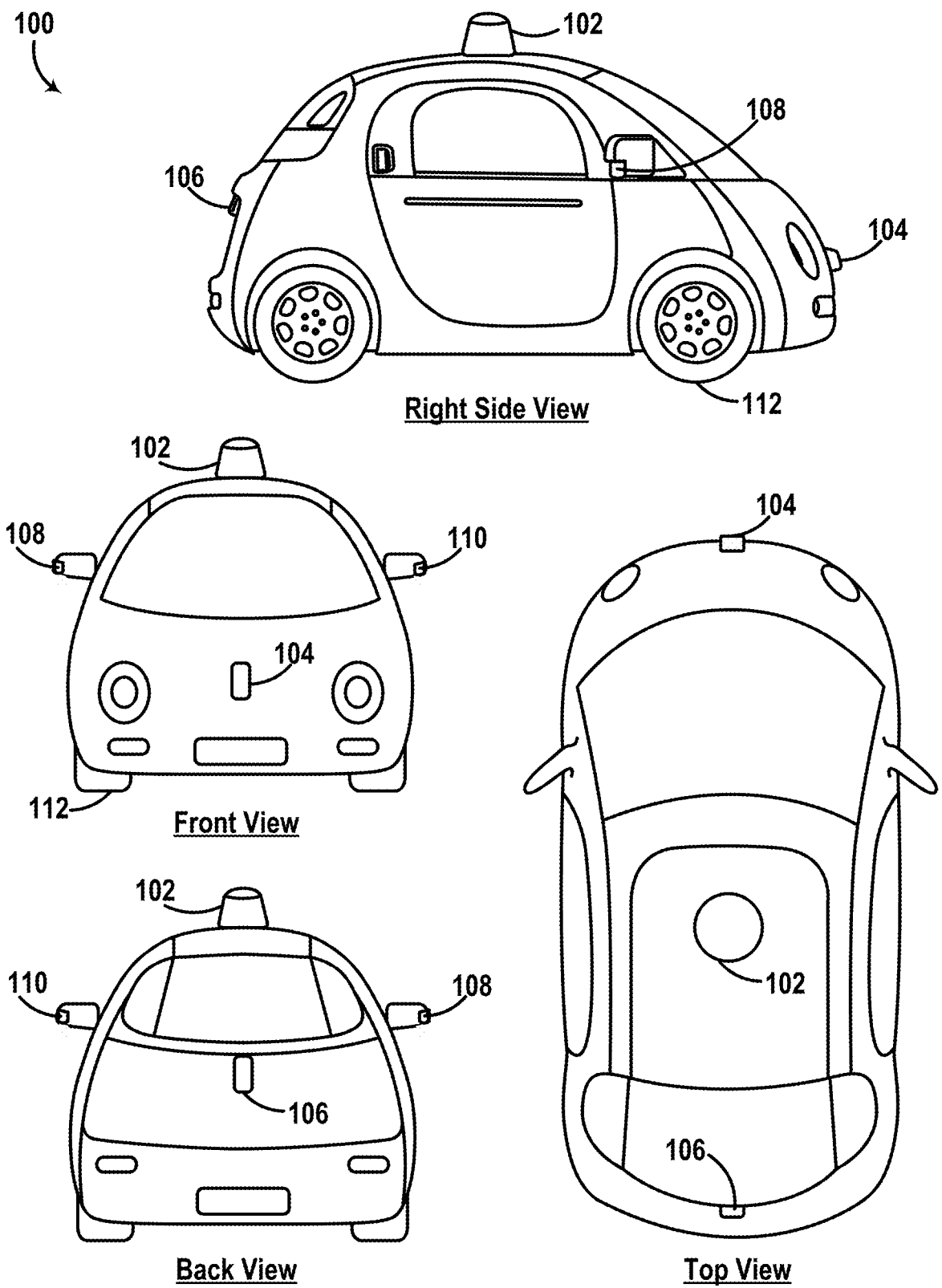
FIG. 1A illustrates a vehicle, according to an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

I. Overview

Within examples, a vehicle may operate one or more sensors, such as radio detection and ranging (RADAR) sensors or light detection and ranging (LIDAR) sensors among other possibilities, to facilitate navigation of the vehicle in an environment that includes other vehicles and/or obstacles along the path of the vehicle. For example, to safely perform a navigation maneuver, such as crossing an intersection or merging onto a street lane among other possibilities, the vehicle may utilize the one or more sensors to monitor a surrounding environment for presence of moving objects (e.g., other vehicles, etc.) prior to and/or while performing such maneuver.

In some examples, the vehicle may be configured to monitor the surrounding environment along multiple directions from the vehicle before safely proceeding with a maneuver. In one example, the vehicle may decide to make a left turn onto a multi-lane high-speed road with uncontrolled traffic in both directions. In this example, the vehicle may be configured to monitor oncoming traffic along both directions of the high-speed road to safely perform the left turn maneuver.

However, in some scenarios, one or more target regions of the environment may be occluded from view of a particular sensor due to various factors. In one example, the position of the particular sensor on the vehicle (e.g., top of vehicle, side of vehicle, etc.) may prevent the particular sensor from having a sufficiently clear view of a target region. In another example, the capabilities of the sensor (e.g., RADAR cross-section, spatial resolution, transparency of particular objects to the particular sensor, etc.) may occlude a view of a target region by the particular sensor, at least with respect to detection of moving objects. In yet another example, obstacles in the environment along a line-of-sight of the particular sensor (e.g., trees, street signs, other vehicles, debris, etc.) may occlude a view of a target region by the particular sensor. In still another example, electromagnetic interference (e.g., background noise, radiation from other sensors in the environment, etc.) may occlude a view of a target region by the particular sensor, at least with respect to detection of moving objects. Other scenarios are possible as well.

Example embodiments herein include methods and systems for clearing occlusions for a sensor with respect to a target region of an environment of the sensor. In some examples herein, the term "clearing occlusions" may refer to a process for determining and/or evaluating the likelihood that the sensor has a sufficiently clear view of a target region of the environment to be able to monitor the target region for presence of moving objects.

In some examples, the determination that the sensor has a sufficiently clear view of a target region to be able to monitor the target region for presence of moving objects may be based on one or more factors. For instance, the sensor may be deemed to have the sufficiently clear view based on at least a determination that the sensor has a line-of-sight visibility with respect to the target region (e.g., the line-of-sight of the sensor is not obstructed by objects between the sensor and the target region, etc.). Additionally or alternatively, for instance, the sensor may be deemed to have the sufficiently clear view based on at least a determination that electromagnetic interference (e.g., from other sensors/transmitters, etc.) in the environment is sufficiently low such that the sensor may be able to detect presence of moving objects in the target region. Additionally or alternatively, for instance, the sensor may be deemed to have the sufficiently clear view based on at least a determination that background noise in the environment is sufficiently low such that the sensor may be able to detect presence of moving objects in the target region. Other factors are possible as well and are described in greater detail within exemplary embodiments of the present disclosure. Thus, in some examples, the term "sufficiently clear view" is broadly construed to involve multiple considerations, such as any of the determinations described above among other possibilities, for deciding whether the sensor is suitable for monitoring the target region for presence of moving objects.

One example embodiment involves a vehicle coupled to a plurality of sensors, including a first sensor and a second sensor, configured to scan an environment of the vehicle. For instance, the first sensor may be a LIDAR sensor positioned on a top-side of the vehicle and having a field-of-view (FOV) defined by horizontal and vertical extents to scan a portion of the environment extending away from the first sensor along a viewing direction of the first sensor. Further, in this instance, the second sensor may be a RADAR sensor positioned at a passenger-side (or driver-side) of the vehicle to scan a portion of the environment within a FOV of the second sensor for presence of objects that have at least a threshold RADAR cross-section. Other sensor configurations and/or positions are possible as well, and are described in greater detail within exemplary embodiments herein.

In this embodiment, the vehicle may be configured to identify a target region of the environment to be monitored for presence of moving objects. For instance, the vehicle may decide to perform a navigational maneuver (e.g., left turn, right turn, U-turn, etc.), and may identify one or more target regions of the environment to monitor during (and/or prior to) performing the maneuver for oncoming traffic.

Additionally, in this embodiment, the vehicle may then be configured to operate the first sensor (e.g., LIDAR, etc.) to obtain a scan of a portion of the environment that includes at least a portion of the target region and an intermediate region between the vehicle and the target region. For instance, the vehicle may adjust the viewing direction of the first sensor such that the FOV of the first sensor at least partially overlaps with the target region, and may then operate the first sensor to scan the FOV.

Additionally, in this embodiment, the vehicle may then be configured to determine, based on at least the scan by the first sensor, that the second sensor is suitable for monitoring the target region for presence of moving objects. For instance, the vehicle may determine that the second sensor has a sufficiently clear view of the target region (e.g., clear from occlusions, etc.), and may thereby assign the second sensor for monitoring the target region prior to (and/or during) performance of the maneuver by the vehicle.

In one example, where the first sensor is a LIDAR sensor and the second sensor is a RADAR sensor, detection of an object (or lack of a detection) by the RADAR sensor may not necessarily indicate whether the RADAR sensor has a clear line-of-sight view of the target region (e.g., sufficiently clear view), or whether the detection indicates presence of a moving object within the target region. For instance, the detection indicated by the RADAR sensor in this example may be due to radio wave reflections from objects outside the target region, interference from other RADAR sensors, background noise in the environment, or presence of a stationary object, among other possibilities. Thus, in this example, the LIDAR sensor (first sensor) may be operated by the vehicle to determine whether the RADAR sensor (second sensor) has a sufficiently clear view of the target region to be able to monitor the target region for presence of moving objects.

In some example embodiments herein, the vehicle may be configured to identify multiple target regions to be monitored for presence of moving objects. For example, in a scenario where the vehicle decides to perform a left turn maneuver onto a multi-lane road, the vehicle may decide to monitor oncoming traffic along both directions of the multi-lane road. Further, in this example, the FOV of the first sensor (and/or the second sensor) might not encompass all the multiple target regions simultaneously. Thus, in this example, the vehicle may assign the second sensor to monitor the target region along one direction of the multi-lane road, thereby freeing the first sensor to scan at least a portion of another target region associated with another direction of the oncoming traffic. In one instance, the vehicle may assign the first sensor to monitor presence of moving objects along one direction, and the vehicle may assign the second sensor to monitor presence of moving objects along the other direction. In another instance, the vehicle may operate the first sensor to clear occlusions for a third sensor to monitor the other target region for presence of moving objects, similarly to the operation of the first sensor to clear occlusions for the second sensor.

In some implementations described herein, the vehicle may be configured to operate the first sensor to obtain multiple scans associated with the multiple target regions. For instance, the vehicle may be configured to repeatedly adjust the viewing direction of the first sensor such that a respective scan obtained by the first sensor at least partially overlaps with a respective target region associated with the respective scan. Thus, in such implementations, the vehicle may be configured to select one or more particular sensors to monitor the multiple target regions based on the multiple scans indicating that the respective sensors are suitable for monitoring the respective target regions for presence of moving objects.

II. Illustrative Systems and Devices

Example systems and devices will now be described in greater detail. In general, the embodiments disclosed herein can be used with any system that includes a plurality of sensors physically arranged in the system to scan an environment of the system. Illustrative embodiments described herein include vehicles that employ sensors, such as LIDARs, RADARs, sonars, ultrasonic sensors, etc., for scanning an environment. However, an example system may also be implemented in or take the form of other devices, such as stationary systems, sensing platforms, robotic devices, industrial systems (e.g., assembly lines, etc.), medical devices (e.g., medical imaging devices, etc.), or mobile communication systems, among other possibilities.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, or a farm vehicle, as well as a carrier that rides on a track such as a roller coaster, trolley, tram, or train car, among other examples.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting. As shown, the vehicle 100 includes five sensor units 102, 104, 106, 108, and 110, and four wheels, exemplified by wheel 112.

In some embodiments, each of the sensor units 102-110 may include one or more light detection and ranging devices (LIDARs) that have particular configuration properties to allow scanning an environment around the vehicle 100. Additionally or alternatively, in some embodiments, the sensor units 102-110 may include any combination of sensors, such as global positioning system sensors, inertial measurement units, radio detection and ranging (RADAR) units, cameras, laser rangefinders, LIDARs, and/or acoustic sensors among other possibilities.

As shown, the sensor unit 102 is mounted to a top side of the vehicle 100 opposite to a bottom side of the vehicle 100 where the wheel 112 is mounted. Further, the sensor units 104-110 are each mounted to a given side of the vehicle 100 other than the top side. For example, the sensor unit 104 is positioned at a front side of the vehicle 100, the sensor 106 is positioned at a back side of the vehicle 100, the sensor unit 108 is positioned at a right side of the vehicle 100, and the sensor unit 110 is positioned at a left side of the vehicle 100.

While the sensor units 102-110 are shown to be mounted in particular locations on the vehicle 100, in some embodiments, the sensor units 102-110 may be mounted elsewhere on the vehicle 100, either inside or outside the vehicle 100. For example, although FIG. 1A shows the sensor unit 108 mounted to a rear-view mirror of the vehicle 100, the sensor unit 108 may alternatively be positioned in another location along the right side of the vehicle 100. Further, while five sensor units are shown, in some embodiments more or fewer sensor units may be included in the vehicle 100. However, for the sake of example, the sensor units 102-110 are positioned as shown in FIG. 1A.

In some embodiments, one or more of the sensor units 102-110 may include one or more movable mounts on which the sensors may be movably mounted. The movable mount may include, for example, a rotating platform. Sensors mounted on the rotating platform could be rotated so that the sensors may obtain information from various directions around the vehicle 100. For example, a LIDAR of the sensor unit 102 may have a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of the sensor units 102-110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, the vehicle 100 includes one or more wheels such as the wheel 112 that are configured to rotate to cause the vehicle to travel along a driving surface. In some embodiments, the wheel 112 may include at least one tire coupled to a rim of the wheel 112. To that end, the wheel 112 may include any combination of metal and rubber, or a combination of other materials. The vehicle 100 may include one or more other components in addition to or instead of those shown.

Figure 1B:
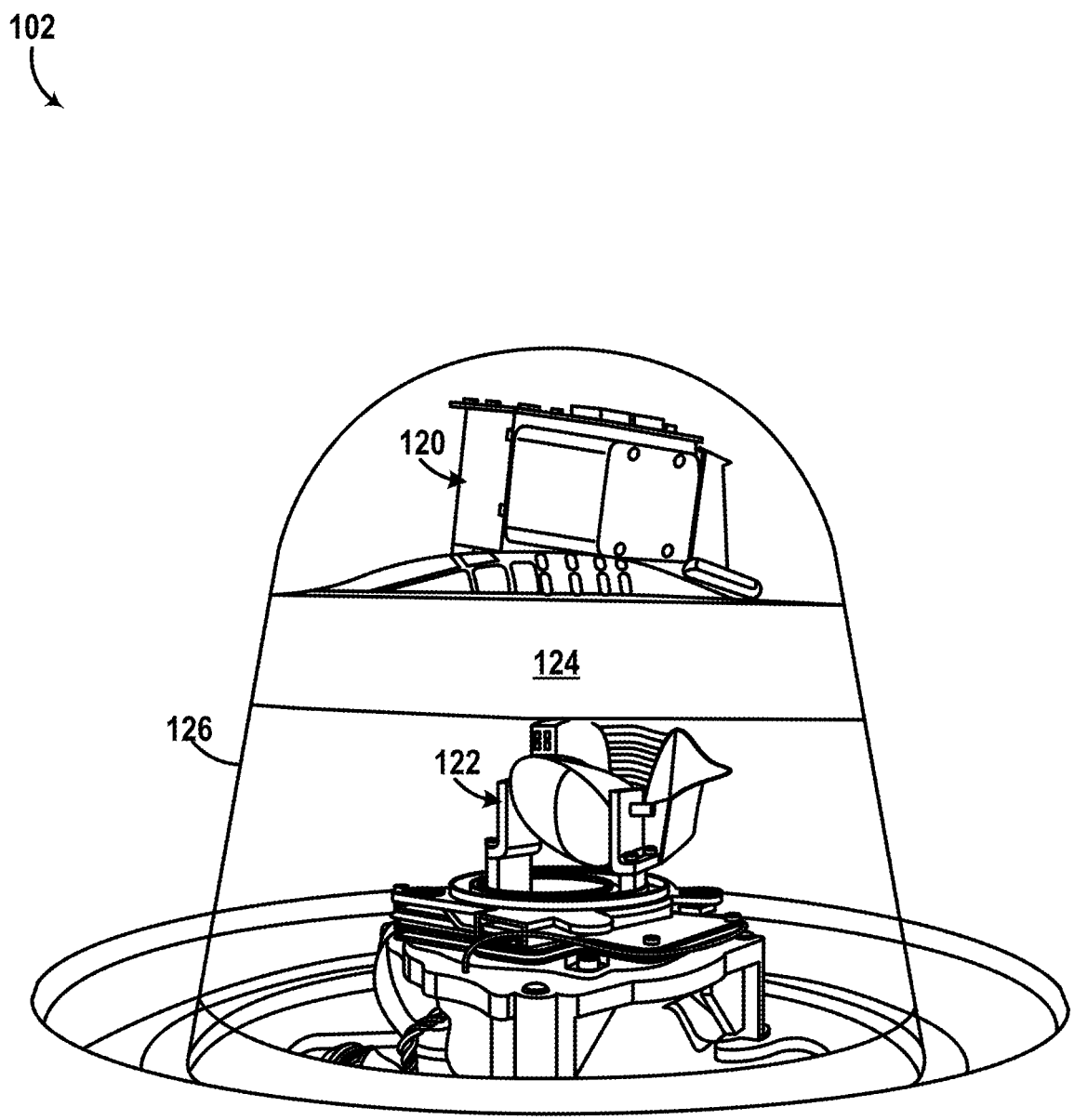
FIG. 1B is a perspective view of a sensor unit positioned at a top side of the vehicle shown in FIG. 1A, according to an example embodiment.

FIG. 1B is a perspective view of the sensor unit 102 positioned at the top side of the vehicle 100 shown in FIG. 1A. As shown, the sensor unit 102 includes a first LIDAR 120, a second LIDAR 122, a dividing structure 124, and light filter 126. As noted above, the sensor unit 102 may additionally or alternatively include other sensors than those shown in FIG. 1B. However, for the sake of example, the sensor unit 102 includes the components shown in FIG. 1B.

In some examples, the first LIDAR 120 may be configured to scan an environment around the vehicle 100 by rotating about an axis (e.g., vertical axis, etc.) while emitting one or more light pulses and detecting reflected light pulses off objects in the environment of the vehicle, for example. In some embodiments, the first LIDAR 120 may be configured to repeatedly rotate about the axis to be able to scan the environment at a sufficiently high refresh rate to quickly detect motion of objects in the environment. For instance, the first LIDAR 120 may have a refresh rate of 10 Hz (e.g., ten complete rotations of the first LIDAR 120 per second), thereby scanning a 360-degree field-of-view (FOV) around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. In this embodiment, the 3D map may have sufficient resolution to detect or identify objects within a medium range of 100 meters from the vehicle 100, for example. However, other configurations (e.g., number of light sources, angular resolution, wavelength, range, etc.) are possible as well.

In some embodiments, the second LIDAR 122 may be configured to scan a narrower FOV of the environment around the vehicle 100. For instance, the second LIDAR 122 may be configured to rotate (horizontally) for less than a complete rotation about a similar axis. Further, in some examples, the second LIDAR 122 may have a lower refresh rate than the first LIDAR 120. Through this process, the vehicle 100 may determine a 3D map of the narrower FOV of the environment using the data from the second LIDAR 122. The 3D map in this case may have a higher angular resolution than the corresponding 3D map determined based on the data from the first LIDAR 120, and may thus allow detection/identification of objects that are further than the medium range of distances of the first LIDAR 120, as well as identification of smaller objects within the medium range of distances. In one embodiment, the second LIDAR 122 may have a FOV of 8° (horizontal)×15° (vertical), a refresh rate of 4 Hz, and may emit one narrow beam having a wavelength of 1550 nm. In this embodiment, the 3D map determined based on the data from the second LIDAR 122 may have an angular resolution of 0.1° (horizontal)×0.03° (vertical), thereby allowing detection/identification of objects within a long range of 300 meters to the vehicle 100. However, other configurations (e.g., number of light sources, angular resolution, wavelength, range, etc.) are possible as well.

In some examples, the vehicle 100 may be configured to adjust a viewing direction of the second LIDAR 122. For example, while the second LIDAR 122 has a narrow horizontal FOV (e.g., 8 degrees), the second LIDAR 122 may be mounted to a stepper motor (not shown) that allows adjusting the viewing direction of the second LIDAR 122 to directions other than that shown in FIG. 1B. Thus, in some examples, the second LIDAR 122 may be steerable to scan the narrow FOV along any viewing direction from the vehicle 100.

The structure, operation, and functionality of the first LIDAR 120 and the second LIDAR 122 are described in greater detail within exemplary embodiments herein.

The dividing structure 124 may be formed from any solid material suitable for supporting the first LIDAR 120 and/or optically isolating the first LIDAR 120 from the second LIDAR 122. Example materials may include metals, plastics, foam, among other possibilities.

The light filter 126 may be formed from any material that is substantially transparent to light having wavelengths with a wavelength range, and substantially opaque to light having wavelengths outside the wavelength range. For example, the light filter 126 may allow light having the first wavelength of the first LIDAR 120 (e.g., 905 nm) and the second wavelength of the second LIDAR 122 (e.g., 1550 nm) to propagate through the light filter 126. As shown, the light filter 126 is shaped to enclose the first LIDAR 120 and the second LIDAR 122. Thus, in some examples, the light filter 126 may also be configured to prevent environmental damage to the first LIDAR 120 and the second LIDAR 122, such as accumulation of dust or collision with airborne debris among other possibilities. In some examples, the light filter 126 may be configured to reduce visible light propagating through the light filter 126. In turn, the light filter 126 may improve an aesthetic appearance of the vehicle 100 by enclosing the first LIDAR 120 and the second LIDAR 122, while reducing visibility of the components of the sensor unit 102 from a perspective of an outside observer, for example. In other examples, the light filter 126 may be configured to allow visible light as well as the light from the first LIDAR 120 and the second LIDAR 122.

In some embodiments, portions of the light filter 126 may be configured to allow different wavelength ranges to propagate through the light filter 126. For example, an upper portion of the light filter 126 above the dividing structure 124 may be configured to allow propagation of light within a first wavelength range that includes the first wavelength of the first LIDAR 120. Further, for example, a lower portion of the light filter 126 below the dividing structure 124 may be configured to allow propagation of light within a second wavelength range that includes the second wavelength of the second LIDAR 122. In other embodiments, the wavelength range associated with the light filter 126 may include both the first wavelength of the first LIDAR 120 and the second wavelength of the second LIDAR 122.

In one embodiment, as shown, the light filter 126 has a dome shape and provides a dome-shaped housing for the first LIDAR 120 and the second LIDAR 122. For instance, the dome-shaped housing (e.g., light filter 126) may include the dividing structure 124 that is positioned between the first LIDAR 120 and the second LIDAR 122. Thus, in this embodiment, the first LIDAR 120 may be disposed within the dome-shaped housing. Further, in this embodiment, the second LIDAR 122 may also be disposed within the dome-shaped housing and may be positioned between the first LIDAR 120 and the top side of the vehicle 100 as shown in FIG. 1B.

Figure 1C:
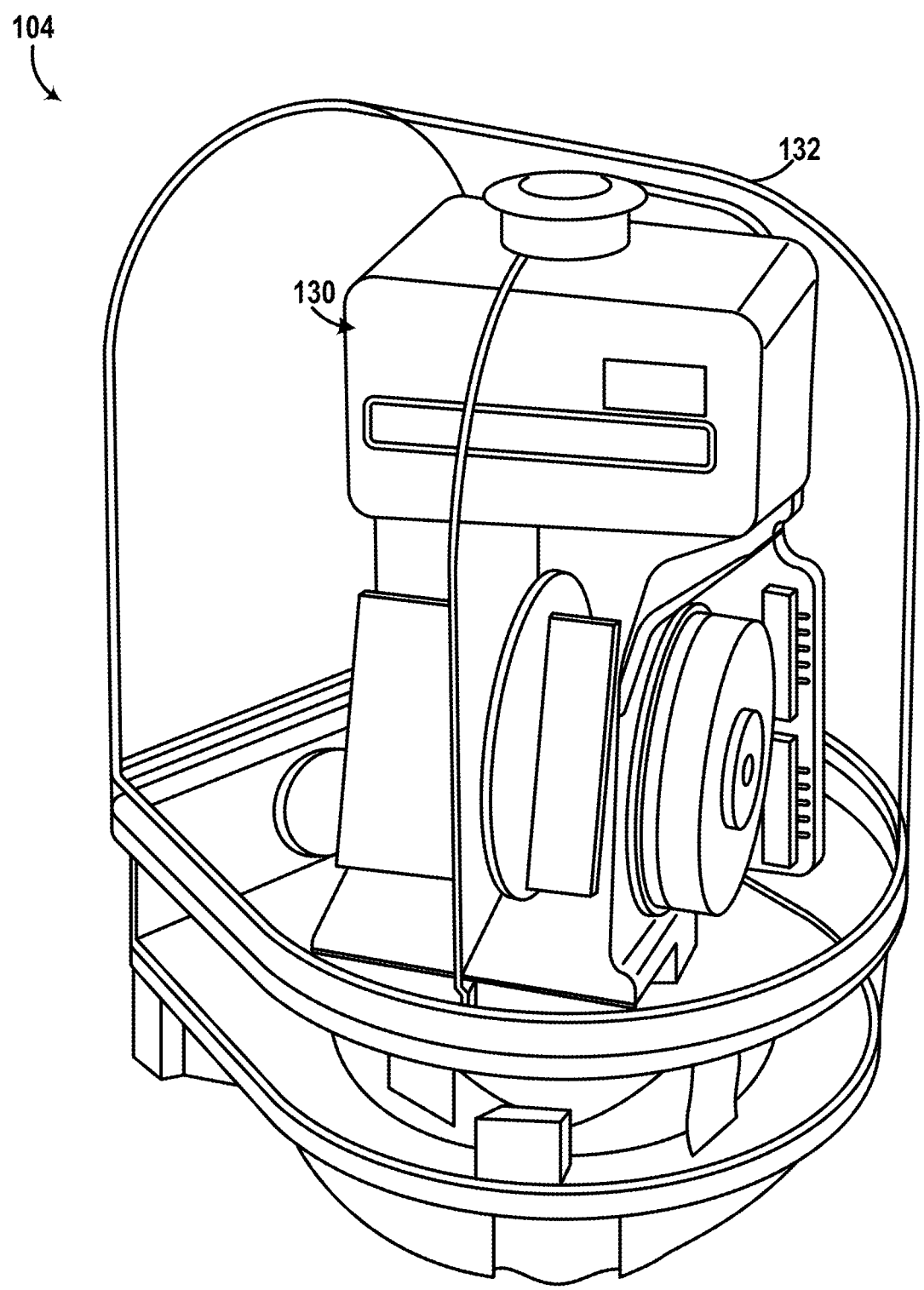
FIG. 1C is a perspective view of a sensor unit positioned at a front side of the vehicle shown in FIG. 1A, according to an example embodiment.

FIG. 1C is a perspective view of the sensor unit 104 positioned at the front side of the vehicle 100 shown in FIG. 1A. In some examples, the sensor units 106, 108, and 110 may be configured similarly to the sensor unit 104 illustrated in FIG. 1C. As shown, the sensor unit 104 includes a third LIDAR 130 and a light filter 132. As noted above, the sensor unit 104 may additionally or alternatively include other sensors than those shown in FIG. 1C. However, for the sake of example, the sensor unit 104 includes the components shown in FIG. 1C.

The third LIDAR 130 may be configured to scan a FOV of the environment around the vehicle 100 that extends away from a given side of the vehicle 100 (i.e., the front side) where the third LIDAR 130 is positioned. Thus, in some examples, the third LIDAR 130 may be configured to rotate (e.g., horizontally) across a wider FOV than the second LIDAR 122 but less than the 360-degree FOV of the first LIDAR 120 due to the positioning of the third LIDAR 130. In one embodiment, the third LIDAR 130 may have a FOV of 270° (horizontal)×110° (vertical), a refresh rate of 4 Hz, and may emit one laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a short range of 30 meters to the vehicle 100. However, other configurations (e.g., number of light sources, angular resolution, wavelength, range, etc.) are possible as well. The structure, operation, and functionality of the third LIDAR 130 are described in greater detail within exemplary embodiments of the present disclosure.

The light filter 132 may be similar to the light filter 126 of FIG. 1B. For example, the light filter 132 may be shaped to enclose the third LIDAR 130. Further, for example, the light filter 132 may be configured to allow light within a wavelength range that includes the wavelength of light from the third LIDAR 130 to propagate through the light filter 132. In some examples, the light filter 132 may be configured to reduce visible light propagating through the light filter 132, thereby improving an aesthetic appearance of the vehicle 100.

Figure 1D:
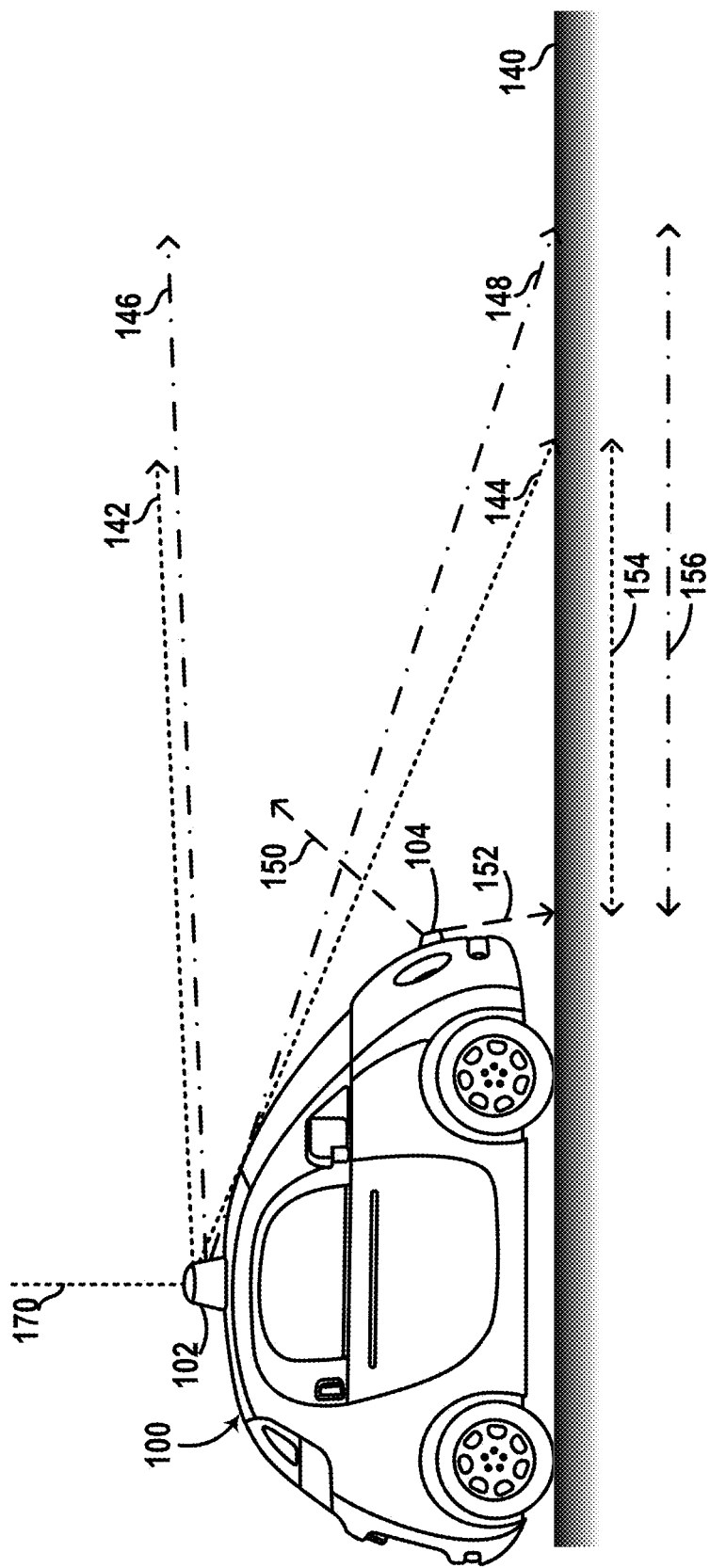
FIG. 1D illustrates in a side view the vehicle shown in FIG. 1A scanning a surrounding environment, according to an example embodiment.
Figure 1E:
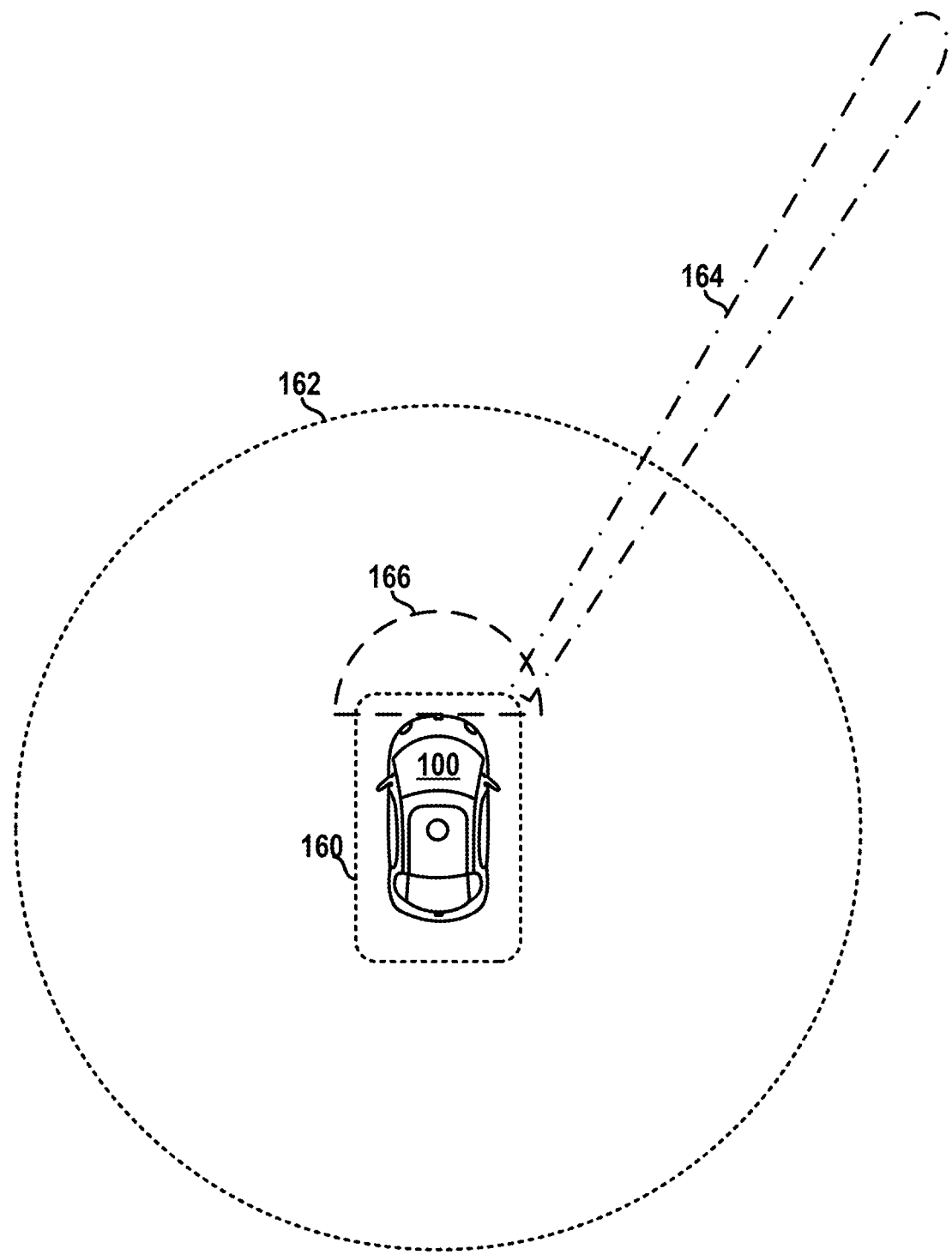
FIG. 1E illustrates in a top view the vehicle shown in FIG. 1A scanning a surrounding environment, according to an example embodiment.
Figure 1F:
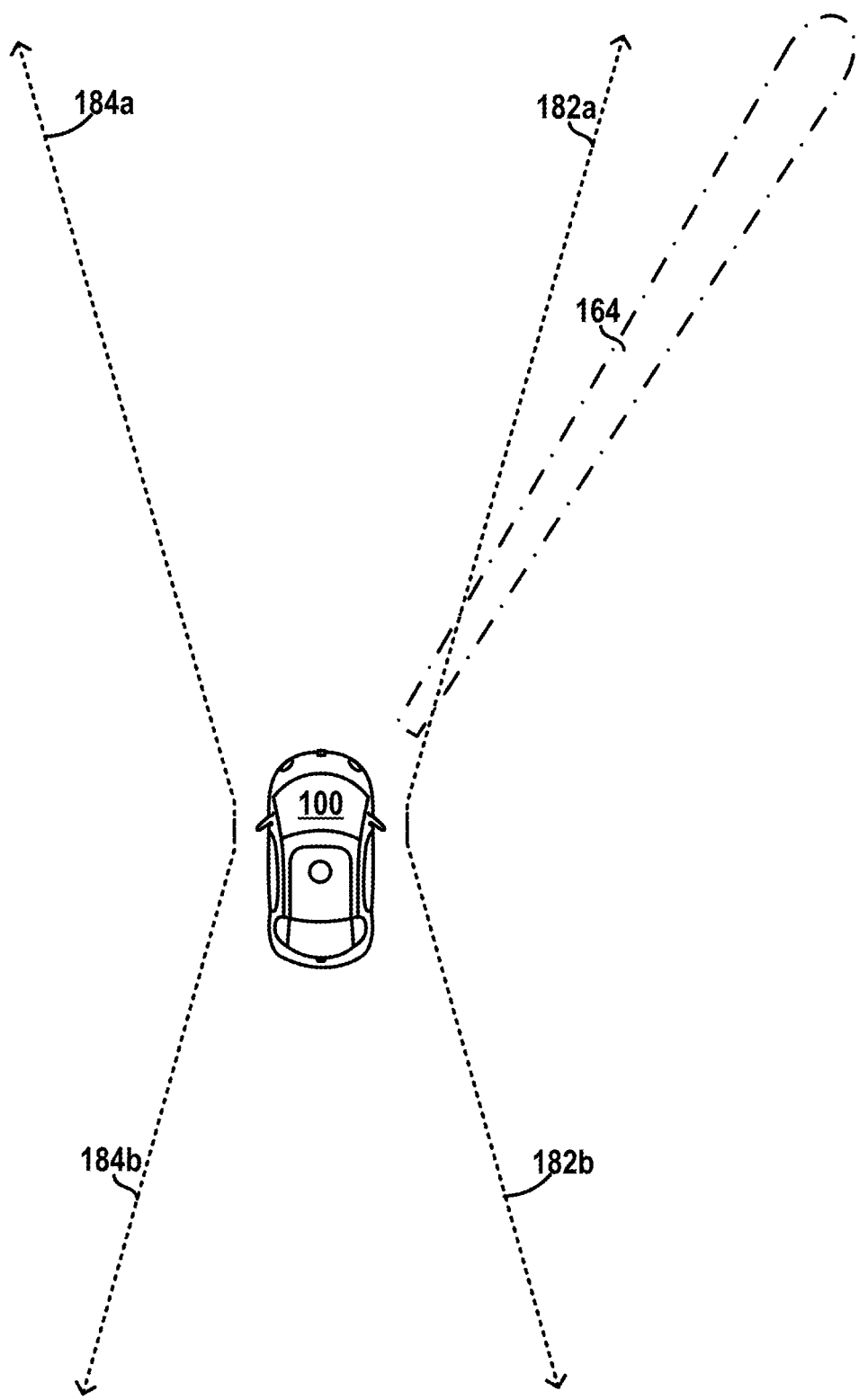
FIG. 1F illustrates in another top view of the vehicle shown in FIG. 1A scanning a surrounding environment, according to an example embodiment.

FIGS. 1D, 1E, and 1F illustrate the vehicle 100 shown in FIG. 1A scanning a surrounding environment, according to an example embodiment.

FIG. 1D illustrates a scenario where the vehicle 100 is operating on a surface 140. The surface 140, for example, may be a driving surface such as a road or a highway, or any other surface. In FIG. 1D, the arrows 142, 144, 146, 148, 150, 152 illustrate light pulses emitted by various LIDARs of the sensor units 102 and 104 at ends of the vertical FOV of the respective LIDAR.

By way of example, arrows 142 and 144 illustrate light pulses emitted by the first LIDAR 120 of FIG. 1B. In this example, the first LIDAR 120 may emit a series of pulses in the region of the environment between the arrows 142 and 144 and may receive reflected light pulses from that region to detect and/or identify objects in that region. Due to the positioning of the first LIDAR 120 (not shown) of the sensor unit 102 at the top side of the vehicle 100, the vertical FOV of the first LIDAR 120 is limited by the structure of the vehicle 100 (e.g., roof, etc.) as illustrated in FIG. 1D. However, the positioning of the first LIDAR 120 in the sensor unit 102 at the top side of the vehicle 100 allows the first LIDAR 120 to scan all directions around the vehicle 100 by rotating about a substantially vertical axis 170. Similarly, for example, the arrows 146 and 148 illustrate light pulses emitted by the second LIDAR 122 of FIG. 1B at the ends of the vertical FOV of the second LIDAR 122. Further, the second LIDAR 122 may also be steerable to adjust a viewing direction of the second LIDAR 122 to any direction around the vehicle 100 in line with the discussion. In one embodiment, the vertical FOV of the first LIDAR 120 (e.g., angle between arrows 142 and 144) is 20° and the vertical FOV of the second LIDAR 122 is 15° (e.g., angle between arrows 146 and 148). However, other vertical FOVs are possible as well depending, for example, on factors such as structure of the vehicle 100 or configuration of the respective LIDARs.

As shown in FIG. 1D, the sensor unit 102 (including the first LIDAR 120 and/or the second LIDAR 122) may scan for objects in the environment of the vehicle 100 in any direction around the vehicle 100 (e.g., by rotating, etc.), but may be less suitable for scanning the environment for objects in close proximity to the vehicle 100. For example, as shown, objects within distance 154 to the vehicle 100 may be undetected or may only be partially detected by the first LIDAR 120 of the sensor unit 102 due to positions of such objects being outside the region between the light pulses illustrated by the arrows 142 and 144. Similarly, objects within distance 156 may also be undetected or may only be partially detected by the second LIDAR 122 of the sensor unit 102.

Accordingly, the third LIDAR 130 (not shown) of the sensor unit 104 may be used for scanning the environment for objects that are close to the vehicle 100. For example, due to the positioning of the sensor unit 104 at the front side of the vehicle 100, the third LIDAR 130 may be suitable for scanning the environment for objects within the distance 154 and/or the distance 156 to the vehicle 100, at least for the portion of the environment extending away from the front side of the vehicle 100. As shown, for example, the arrows 150 and 152 illustrate light pulses emitted by the third LIDAR 130 at ends of the vertical FOV of the third LIDAR 130. Thus, for example, the third LIDAR 130 of the sensor unit 104 may be configured to scan a portion of the environment between the arrows 150 and 152, including objects that are close to the vehicle 100. In one embodiment, the vertical FOV of the third LIDAR 130 is 110° (e.g., angle between arrows 150 and 152). However, other vertical FOVs are possible as well.

It is noted that the angles between the various arrows 142-152 shown in FIG. 1D are not to scale and are for illustrative purposes only. Thus, in some examples, the vertical FOVs of the various LIDARs may vary as well.

FIG. 1E illustrates a top view of the vehicle 100 in a scenario where the vehicle 100 is scanning a surrounding environment. In line with the discussion above, each of the various LIDARs of the vehicle 100 may have a particular resolution according to its respective refresh rate, FOV, or any other factor. In turn, the various LIDARs may be suitable for detection and/or identification of objects within a respective range of distances to the vehicle 100.

As shown in FIG. 1E, contours 160 and 162 illustrate an example range of distances to the vehicle 100 where objects may be detected/identified based on data from the first LIDAR 120 of the sensor unit 102. As illustrated, for example, close objects within the contour 160 may not be properly detected and/or identified due to the positioning of the sensor unit 102 on the top side of the vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

Further, as shown in FIG. 1E, contour 164 illustrates a region of the environment where objects may be detected and/or identified using the higher resolution data from the second LIDAR 122 of the sensor unit 102. As shown, the contour 164 includes objects further away from the vehicle 100 within a long range of distances (e.g., 300 meters, etc.), for example. Although the contour 164 indicates a narrower FOV (horizontally) of the second LIDAR 122, in some examples, the vehicle 100 may be configured to adjust the viewing direction of the second LIDAR 122 to any other direction than that shown in FIG. 1E. By way of example, the vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1E, contour 166 illustrates a region of the environment scanned by the third LIDAR 130 of the sensor unit 104. As shown, the region illustrated by the contour 166 includes portions of the environment that may not be scanned by the first LIDAR 120 and/or the second LIDAR 124, for example. Further, for example, the data from the third LIDAR 130 has a resolution sufficient to detect and/or identify objects within a short distance (e.g., 30 meters, etc.) to the vehicle 100.

It is noted that the ranges, resolutions, and FOVs described above are for exemplary purposes only, and may vary according to various configurations of the vehicle 100. Further, the contours 160-166 shown in FIG. 1E are not to scale but are illustrated as shown for convenience of description.

FIG. 1F illustrates another top view of the vehicle 100 in a scenario where the vehicle 100 is scanning a surrounding environment. In line with the discussion above, the vehicle 100 may include multiple types of sensors such as LIDARs, RADARs, sonars, ultrasound sensors, etc. Further, for example, the various sensors may be suitable for detection and/or identification of objects within respective FOVs of the respective sensors.

In FIG. 1F, contour 164 illustrates the region of the environment where objects may be detected and/or identified using the higher resolution data from the second LIDAR 122 of the sensor unit 102, in line with the discussion above for FIG. 1E.

Further, as shown in FIG. 1F, arrows 182*a* and 182*b* illustrate a region of the environment defined by a FOV of a sensor mounted along a side of the vehicle 100, such as a sensor in the sensor unit 108 of FIG. 1A. For example, the sensor associated with the arrows 182*a* and 182*b* may be a RADAR sensor that is configured to scan a portion of the environment that extends away from the sensor unit 108 of the vehicle 100 between the arrows 182*a* and 182*b*. Additionally or alternatively, in some examples, the sensor associated with the arrows 182*a* and 182*b* may include any other type of sensor (e.g., LIDAR, camera, etc.). However, for the sake of example, arrows 182*a* and 182*b* are described in FIG. 1F as the extents of a FOV of a RADAR sensor in the sensor unit 108. In this example, the RADAR sensor may be configured to detect objects within the region defined by arrows 182*a* and 182*b* that have at least a threshold RADAR cross-section. In one embodiment, the threshold RADAR cross-section may relate to dimensions of a motorcycle, scooter, car, and/or any other vehicle (e.g., 0.5 square meters, etc.). Other example threshold RADAR cross-section values are possible as well.

Similarly, as shown in FIG. 1F, arrows 184*a* and 184*b* illustrate a region of the environment that is within a FOV of another sensor mounted along an opposite side of the vehicle 100, such as a sensor in the sensor unit 110 of FIG. 1A, for example.

It is noted that the angles between the arrows 182*a*, 182*b* and/or 184*a*, 184*b* shown in FIG. 1F are not to scale and are for illustrative purposes only. Thus, in some examples, the horizontal FOVs of the sensors in sensor units 108 and 110 may vary as well.

Figure 2:
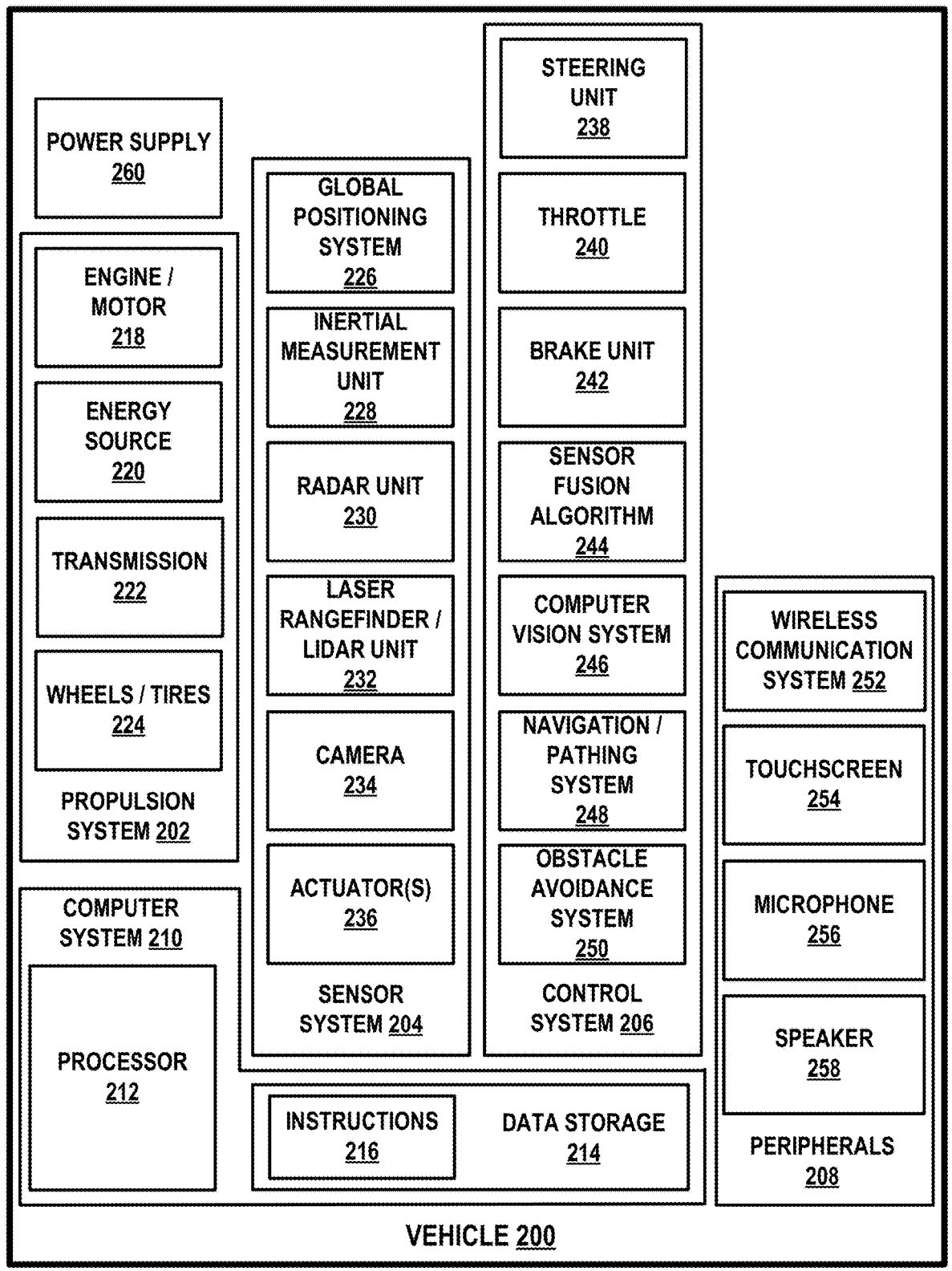
FIG. 2 is a block diagram of a vehicle, according to an example embodiment.

FIG. 2 is a simplified block diagram of a vehicle 200, according to an example embodiment. The vehicle 200 may be similar to the vehicle 100, for example. As shown, the vehicle 200 includes a propulsion system 202, a sensor system 204, a control system 206, peripherals 208, and a computer system 210. In other embodiments, the vehicle 200 may include more, fewer, or different systems, and each system may include more, fewer, or different components. Additionally, the systems and components shown may be combined or divided in any number of ways.

The propulsion system 202 may be configured to provide powered motion for the vehicle 200. As shown, the propulsion system 202 includes an engine/motor 218, an energy source 220, a transmission 222, and wheels/tires 224.

The engine/motor 218 may be or include any combination of an internal combustion engine, an electric motor, a steam engine, and a Stirling engine. Other motors and engines are possible as well. In some embodiments, the propulsion system 202 may include multiple types of engines and/or motors. For instance, a gas-electric hybrid car may include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 may additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts may include one or more axles that are configured to be coupled to the wheels/tires 224.

The wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, the wheels/tires 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials. The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include a Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.), range sensors (e.g., sonars, ultrasonic sensors, etc.), among other possibilities. Further, the sensor system 204 may include multiple LIDARs. In some examples, the sensor system 204 may be implemented as multiple sensor units each mounted to the vehicle in a respective position (e.g., top side, bottom side, front side, back side, right side, left side, etc.). Other sensors are possible as well.

The GPS 226 may be any sensor (e.g., location sensor) configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR unit 230 may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode. In some examples, the LIDAR unit 232 may include multiple LIDARs that each have a unique position and/or configuration suitable for scanning a particular region of an environment around the vehicle 200.

The camera 234 may be any camera (e.g., a still camera, a video camera, etc.) configured to capture images of the environment in which the vehicle 200 is located. To this end, the camera may take any of the forms described above. The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200. The throttle 240 may be any combination of mechanisms configured to control the operating speed of the engine/motor 218 and, in turn, the speed of the vehicle 200. The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, an algorithm for some of the functions of the methods herein, or any another algorithm. The sensor fusion algorithm 244 may further be configured to provide various assessments based on the data from the sensor system 204, including, for example, evaluations of individual objects and/or features in the environment in which the vehicle 100 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, the LIDAR unit 232, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located. The control system 206 may additionally or alternatively include components other than those shown.

Peripherals 208 may be configured to allow the vehicle 200 to interact with external sensors, other vehicles, external computing devices, and/or a user. To this end, the peripherals 208 may include, for example, a wireless communication system 252, a touchscreen 254, a microphone 256, and/or a speaker 258.

The wireless communication system 252 may be any system configured to wirelessly couple to one or more other vehicles, sensors, or other entities, either directly or via a communication network. To this end, the wireless communication system 252 may include an antenna and a chipset for communicating with the other vehicles, sensors, servers, or other entities either directly or via a communication network. The chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 252 may take other forms as well.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200. The peripherals 208 may additionally or alternatively include components other than those shown.

The computer system 210 may be configured to transmit data to, receive data from, interact with, and/or control one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

In one example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for determining a 3D representation of the environment around the vehicle 200 using the LIDAR unit 232. Other examples are possible as well.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions (e.g., method 400). Data storage 214 may contain additional instructions as well, including instructions to transmit data to, receive data from, interact with, and/or control one or more of the propulsion system 202, the sensor system 204, the control system 206, and/or the peripherals 208. The computer system 210 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together as one component, as in some all-electric cars.

In some embodiments, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while each of the components and systems are shown to be integrated in the vehicle 200, in some embodiments, one or more components or systems may be removably mounted on or otherwise connected (mechanically or electrically) to the vehicle 200 using wired or wireless connections. In one example, a portion of the computing system 210 that determines operation instructions for one or more of the sensors in the sensor system 204 may be disposed outside the vehicle 200 (e.g., in a remote server, etc.) that is in communication with the vehicle 200 via a wireless communication interface (e.g., wireless communication system 252, etc.). The vehicle 200 may take other forms as well.

In some embodiments, as noted above, the vehicle 200 may rotate one or more components, such as one or more of the sensors in the sensor system 204 and/or one or more of the peripherals 208, among other possibilities. Referring back to FIG. 1E by way of example, the vehicle 100 scans portions of the environment illustrated by contours 162-166 by rotating respective sensors of the sensor units 102-110. Similarly, the vehicle 200 in some embodiments may mount one or more of its various components on respective rotating platforms to adjust directions of the various components.

III. Illustrative Scenarios

Example scenarios in which example embodiments may be implemented will now be described in greater detail. Illustrative scenarios described herein include a scenario where a vehicle is performing a left turn maneuver. However, other scenarios in which example embodiments may be implemented are possible as well, such as scenarios where a vehicle is performing other autonomous driving maneuvers (e.g., U-turn, right turn, lane change, driveway exit, merge onto a road, etc.). Further, in line with the discussion above, other scenarios are possible as well that involve systems or devices other than vehicles.

Figure 3A:
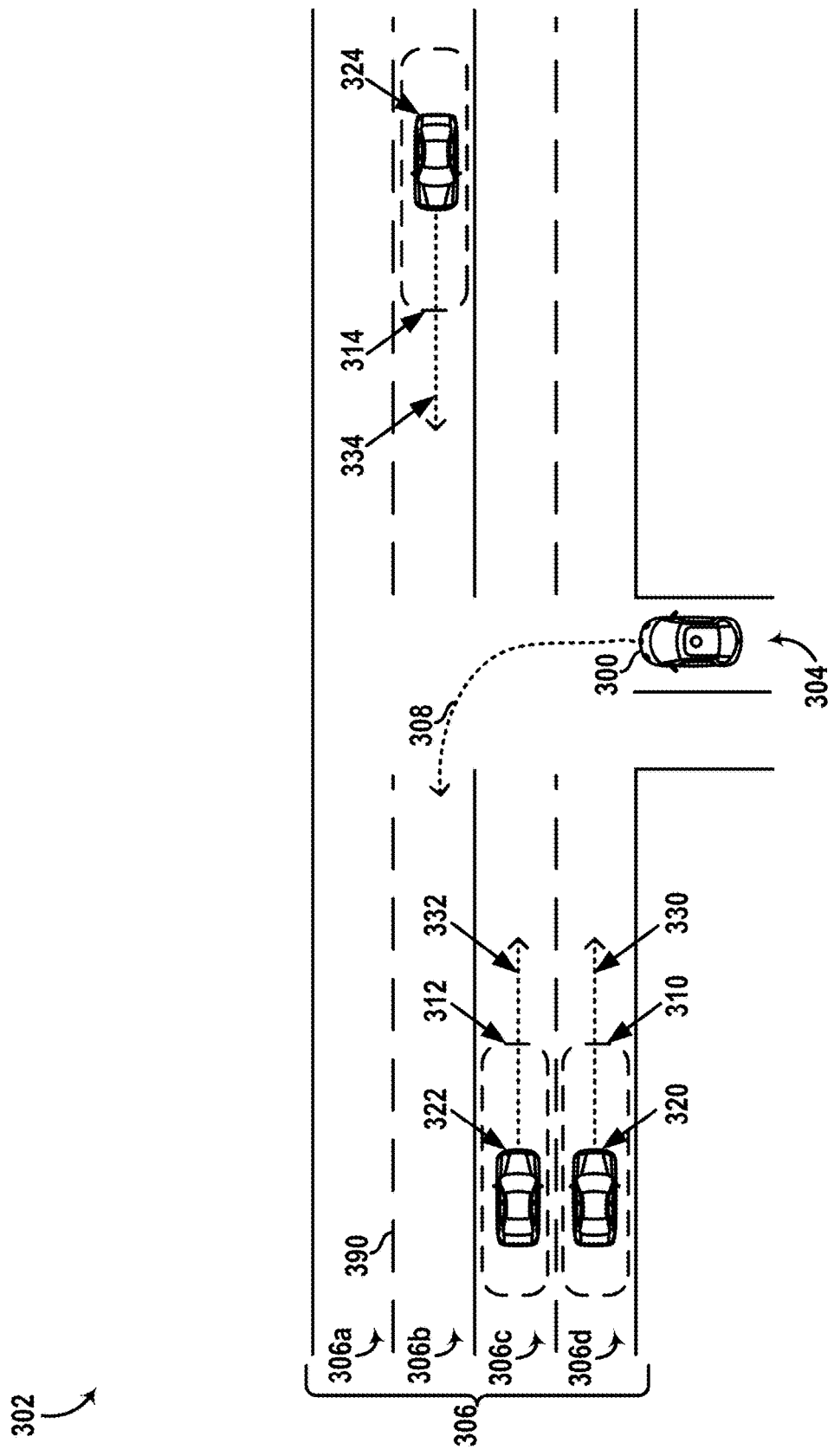
FIG. 3A illustrates a vehicle operating in an environment, according to an example embodiment.

FIG. 3A illustrates a vehicle 300 operating in an environment 302. The vehicle 300 may be similar to the vehicles 100 and/or 200. The environment 302 may include any environment suitable for operation of the vehicle 300, such as a road system, a river system, an aerial navigation system, etc. However, for the sake of example, the environment 302 shown in FIG. 3A includes a road system having a street 304 connected to a multi-lane road 306. Further, as shown, the road 306 includes lanes 306a, 306b, 306c, and 306d, which may be separated by lane marks, exemplified by lane mark 390. Although FIG. 3A shows vehicle 300 as a car, as noted above, the vehicle 300 may take other forms as well (e.g., boat, airplane, helicopter, etc.) in accordance with the environment 302 and the application of the vehicle 300. Thus, embodiments of the present disclosure can be used with various types of systems that include multiple sensors configured to scan a surrounding environment.

FIG. 3A illustrates an example vehicle operation, where the vehicle 300 decides to perform a navigational maneuver. As shown, for example, the vehicle 300 may decide to perform a left turn from the street 304 onto the lane 306b of the road 306, along a path illustrated by arrow 308. In line with the discussion above, other vehicle operations for which example methods and systems herein can be used are possible as well (e.g., pulling out of driveway, making a right turn, backing up, making a U-turn, remaining within a lane, etc.). However, for the sake of example, the scenario of FIG. 3A involves the vehicle 300 making a left turn.

To perform such maneuver safely, for example, the vehicle 300 may identify target regions 310, 312, and 314 to be monitored for presence of moving objects. In some examples, as shown, the target regions 310, 312, 314 may correspond to lane segments (or portions thereof) of the lanes 306b, 306c, and 306d, where oncoming traffic may be present. It is noted that the shapes and locations of the target regions 310, 312, 314 may vary and are not necessarily as shown in FIG. 3A. For instance, the target regions 310 and 312 may be alternatively combined as one target region, or may have different dimensions than those shown, among other possibilities.

As shown, the target regions 310, 312, and 314 may include, respectively, moving objects 320, 322, and 324.

Further, for the sake of example, the moving objects 320, 322, and 324 may be moving towards the path 308 as illustrated, respectively, by arrows 330, 332, and 334. The moving objects 320, 322, and 324 may include any moving objects such as vehicles, moving debris, etc. Although moving objects 320, 322, and 324 are illustrated in FIG. 3A as cars, additionally or alternatively, the moving objects 320, 322, and 324 in some examples may include other objects such as motorcycles, scooters, cyclists, pedestrians (e.g., joggers, walking pedestrians, etc.), or moving debris, among other possibilities. Further, although FIG. 3A shows three moving objects 320, 322 and 324 in the target regions 310, 312, and 314, in some examples, the target regions 310, 312, and 314 may alternatively include additional or fewer moving objects than those shown. In one example, the target regions 310, 312, and 314 may not include any moving objects.

To safely perform the vehicle operation indicated by arrow 308, in some examples, the vehicle 300 may evaluate whether it should wait for one or more of the moving objects 320, 322, 324 to cross the path 308 before performing the left turn maneuver. Accordingly, in some examples, the vehicle 300 may utilize various sensors (e.g., RADARs, LIDARs, etc.) to monitor the target regions 310, 312, 314 for presence of moving objects prior to (and/or during) performance of the maneuver indicated by arrow 308. As noted above, in some examples, the various sensors may each have different mounting positions, resolutions, FOVs, and/or other configurations that affect the suitability of the respective sensors for monitoring the target regions 310, 312, or 314 for presence of moving objects.

Figure 3B:
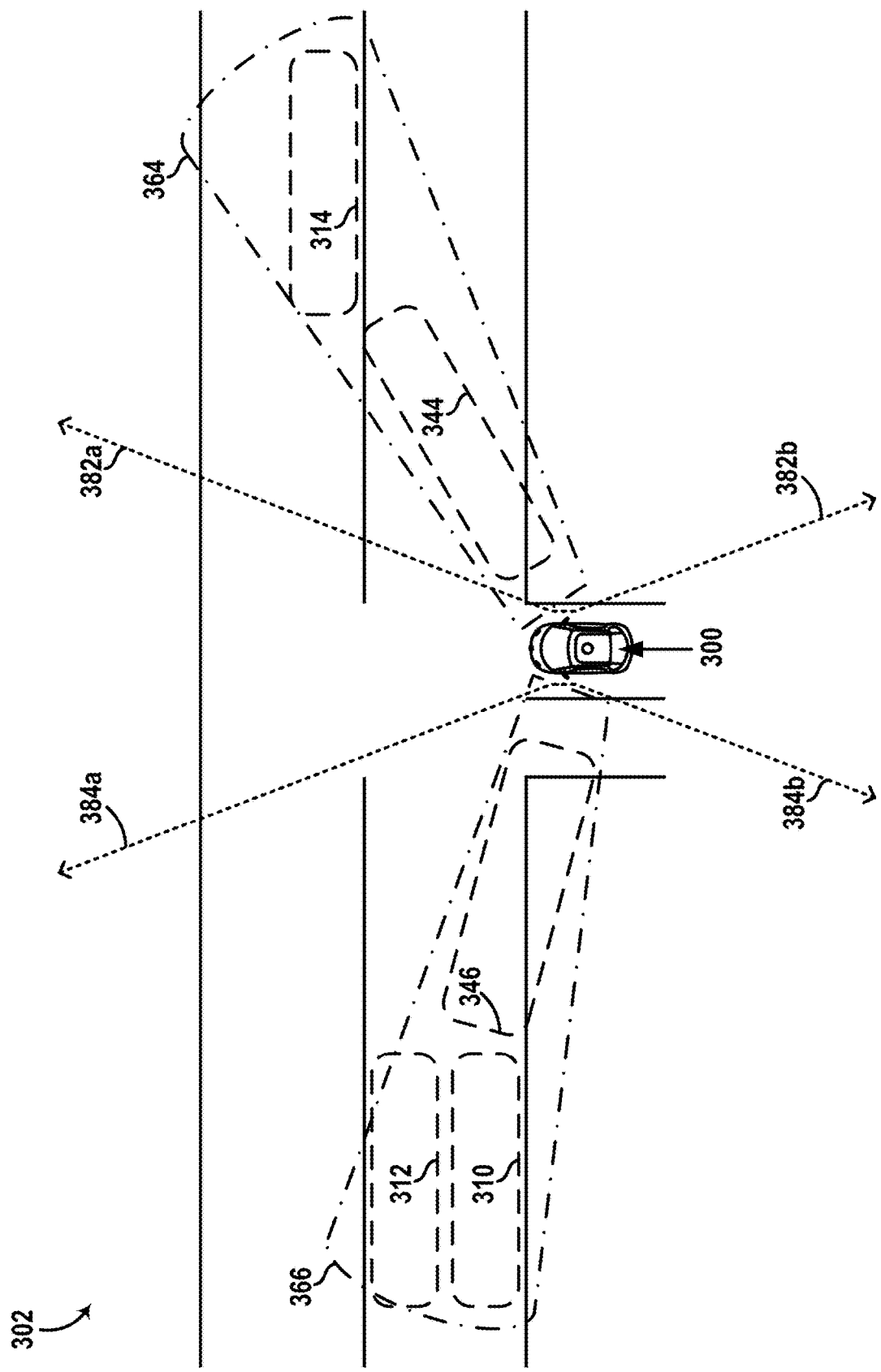
FIG. 3B illustrates the vehicle of FIG. 3A scanning a surrounding environment, according to an example embodiment.

FIG. 3B illustrates the vehicle 300 while in operation, according to an example embodiment. It is noted that some of the features shown in FIG. 3A, such as the moving objects 320, 322, 324, the lane mark 390, etc., are omitted from the illustration of FIG. 3B for convenience in description. In some examples, the vehicle 300 may include multiple sensors (not shown) similar to one or more of the sensors included in the sensor units 102-110 of the vehicle 100, or one or more of the sensors included in the sensor system 204 of the vehicle 200, among other possibilities.

For instance, contour 364 may be similar to the contour 164 of FIG. 1F. For example, the contour 364 may represent a portion of the environment 302 scanned by a first sensor (not shown) of the vehicle 300 when the first sensor is directed towards the target region 314 such that the portion of the environment 302 (e.g., contour 364) scanned by the first sensor includes at least a portion of the target region 314. For instance, the first sensor may be a LIDAR sensor (e.g., the LIDAR sensor 122 of the vehicle 100, etc.) that has a sufficiently high resolution and range to be able to scan the portion of the environment 302 associated with contour 364. Additionally or alternatively, the first sensor may be any other sensor (e.g., LIDAR 120, LIDAR 124, RADAR sensor, camera, ultrasonic sensor, ultrasound sensor, microphone, sonar, any of the sensors in sensor system 204 of the vehicle 200, etc.) configured to scan a portion of the environment 302 that includes at least a portion of the target region 314.

As noted above, in some scenarios, the first sensor may be suitable for monitoring one or more of the target regions 310, 312, or 314 for presence of moving objects, but may be less suitable for monitoring a particular combination of two or more of the target regions 310, 312, and 314 simultaneously for presence of moving objects. For example, as shown, the portion of the environment indicated by contour 364 may be defined by a horizontal extent of the FOV of the first sensor (e.g., LIDAR 122, etc.), similarly to the contour 164 of FIGS. 1E and 1F. In this example, such horizontal FOV may be less suitable for encompassing a combination of target region 310 and target region 314, or a combination of target region 312 and target region 314, etc., at the same time.

Thus, in some examples, after the first sensor scans a portion of the environment indicated by contour 364, the vehicle 300 may be configured to adjust the viewing direction of the first sensor (not shown) such that the FOV of the first sensor overlaps with at least a portion of the target region 310. In this example, the vehicle 300 may then scan a portion of the environment that includes the target region 310 as indicated by contour 366.

Further, as shown, a portion of the environment 302 between arrows 382a and 382b may be scanned by a second sensor (not shown) of the vehicle 300, similarly to the portion of the environment indicated by arrows 182a and 182b of FIG. 1F. Further, as shown, a portion of the environment 302 between arrows 384a and 384b may be scanned by a third sensor (not shown) of the vehicle 300, similarly to the portion of the environment indicated by arrows 184a and 184b of FIG. 1F.

As noted above, in some scenarios, the second sensor (not shown) associated with the scan of the portion of the environment 302 between arrows 382a and 382b may be less suitable for monitoring the target region 314 for presence of moving objects, even if the FOV of the second sensor overlaps with the target region 314.

In a first example scenario, the second sensor may be a camera mounted to a side of the vehicle (e.g., in sensor unit 108 of the vehicle 100, etc.) to view the portion of the environment 302 between arrows 382a and 382b. In this scenario, the camera may be occluded from view of the target region 314 even though the FOV of the camera overlaps with the target region 314. In one instance, the camera may not have a sufficiently clear view of the target region 314 due to the presence of one or more objects (e.g., trees, walls, street signs, vehicles, pedestrians, etc.) in the target region 314 itself, in an intermediate region 344 of the environment 302 between the camera and the target region 314, or any other region of the environment 302 that is near or adjacent to the target region 314. In another instance, the target region 314 may be occluded from view of the camera due to interference from a bright light source, a mirror, or background light in the environment, among other possibilities.

In a second example scenario, the second sensor may be a RADAR sensor mounted to a side of the vehicle (e.g., in sensor unit 108 of the vehicle 100, etc.) to scan a portion of the environment 302 between arrows 382a and 382b. In this scenario, the RADAR sensor may be occluded from view of the target region 314 even though the FOV of the RADAR sensor overlaps with the target region 314. In one instance, the RADAR sensor may not have a sufficiently clear view of the target region 314 due to the presence of one or more objects in intermediate region 344, the target region 314, or any other region of the environment 302 that is near or adjacent to the target region 314, where the one or more objects are not transparent to wavelength(s) of electromagnetic waves transmitted by the RADAR sensor. In another instance, the target region 314 may be occluded from view of the RADAR sensor due to interference from a wireless transmitter (e.g., antenna, another RADAR sensor, etc.), a reflective surface (e.g., street sign, etc.), or background radiation in the environment 302 (e.g., noise, etc.), among other possibilities. In yet another instance, the target region 314 may include stationary/moving debris (e.g., clutter, etc.) that may be undetected by the RADAR sensor initially, but may cause objects moving near the debris to be identified as stationary objects (e.g., debris may introduce a bias to the RADAR cross-section of the moving objects).

In a third example scenario, data from the second sensor may be less suitable (than data from the first sensor) for determining whether the second sensor is occluded from viewing the target region 314 (and/or monitoring the target region 314 for presence of moving objects). For example, where the second sensor is a RADAR sensor, detections by the RADAR sensor may be due to interference from other RADAR sensors in the environment 302, background noise in the environment 302, etc. Additionally or alternatively, in this example, a lack of detections by the RADAR sensor (e.g., for objects in the intermediate region 344, etc.) may not necessarily indicate that the RADAR sensor is not occluded from viewing the target region 314. In one instance, the lack of detections by the RADAR sensor may be due to a reflector (not shown) reflecting emitted radio waves from the RADAR sensor away from the RADAR sensor instead of reflecting the waves back to the RADAR sensor. In another instance, the lack of detection by the RADAR sensor may be due to an object (not shown) absorbing the emitted waves from the RADAR sensor instead of reflecting the emitted waves back to the RADAR sensor, or allowing the emitted waves to continue propagating towards the target region 314. Other instances are possible as well. Thus, in this example, data from the first sensor (e.g., LIDAR sensor) may be more suitable for clearing such occlusions for the second sensor (e.g., RADAR sensor) with respect to the target region 314.

Similarly, in some scenarios, the third sensor (not shown) associated with the scan of the portion of the environment 302 between arrows 384a and 384b may be less suitable for monitoring the target regions 310 and/or 312 for presence of moving objects, even if the FOV of the third sensor overlaps with the target regions 310 and/or 312 (as shown). For instance, the third sensor may be occluded from viewing the target regions 310 and/or 312 due to presence of objects in intermediate region 346, presence of objects in the target regions 310 and/or 312, presence of objects in other regions of the environment 302, electromagnetic interference (e.g., from other sensors/transmitters, etc.) with the third sensor, background noise, capabilities of the third sensor, etc., similarly to the example scenarios discussed above for the second sensor.

Other scenarios for which example embodiments can be used are possible as well, such as scenarios involving other types of sensors (e.g., ultrasonic sensors, microphone sensors, sonar sensors, LIDAR sensors, etc.), different moving objects, different environmental factors, etc. For instance, an example scenario may involve a sound sensor that may be affected by interference from sound sources and/or noise in the environment 302, among other possibilities.

It is noted that the locations, dimensions, and shapes of the various regions 310, 312, 314, 344, and 346 are not necessarily to scale and may be different from the illustrations shown in FIGS. 3A and 3B. Further, it is noted that the directions, shapes, and dimensions of the various scanning regions indicated by contours 364, 366, and arrows 382a, 382b, 384a, 384b, are not necessarily to scale and may be different from the illustrations shown in FIGS. 3A and 3B. Thus, the various features may vary and are only illustrated as shown in FIGS. 3A and 3B for convenience in description.

IV. Illustrative Methods and Computer-Readable Media

Within examples, methods herein may involve determining whether a sensor is suitable for monitoring a target region of an environment for presence of moving objects based on at least a scan of the environment by another sensor. Further, in some examples, methods herein may involve assigning a particular sensor to monitor one or more particular target regions of the environment based on at least a determination of whether the particular sensor is suitable for monitoring the one or more particular target regions for presence of moving objects.

Figure 4:
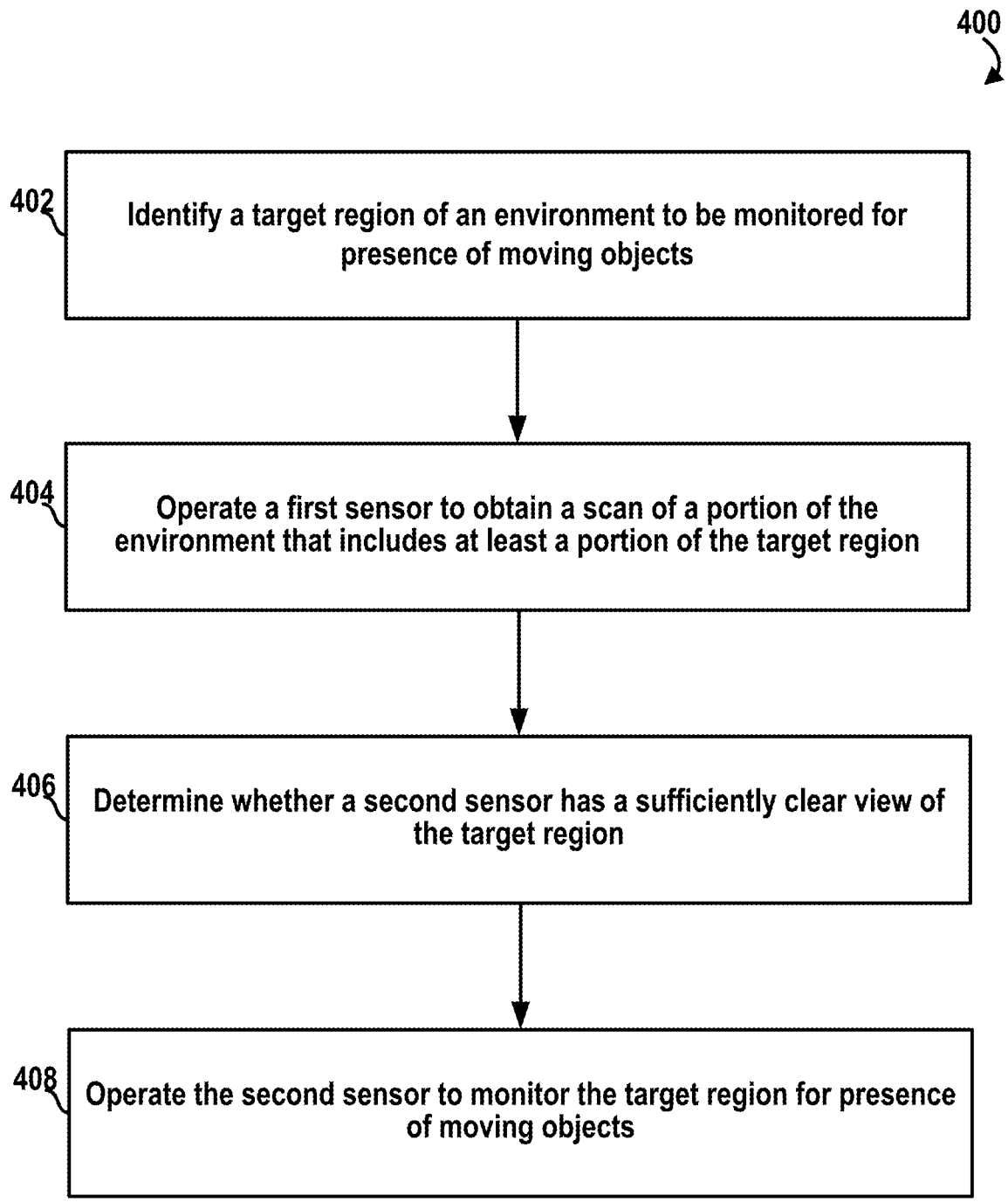
FIG. 4 is a flowchart of a method, according to an example embodiment.

FIG. 4 is a flowchart of a method 400, according to an example embodiment. Method 400 shown in FIG. 4 presents an embodiment of a method that could be used with any of the vehicles 100, 200, and/or 300, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

At block 402, the method 400 involves identifying a target region of an environment to be monitored for presence of moving objects. For example, referring back to FIG. 3A, the target region may be similar to any of the target regions 310, 312, 314 and the moving objects may be similar to any of the moving objects 320, 322, 324. In this example, a computing device disposed in a vehicle (e.g., computer system 210 of the vehicle 200, etc.) or a computing device disposed outside the vehicle (e.g., a remote server, etc.) may be configured to identify the target region (e.g., in response to a decision to perform a maneuver, etc.).

At block 404, the method 400 involves operating a first sensor to obtain a scan of a portion of the environment that includes at least a portion of the target region. The first sensor may be similar to any of the sensors included in the sensor units 102-110 of the vehicle 100, or any of the sensors included in the sensor system 204 of the vehicle 200, among other possibilities. In some examples, the portion of the environment may also include an intermediate region between the target region and the first sensor. For example, referring back to FIG. 3B, the portion of the environment scanned by the first sensor may be similar to the portion indicated by contour 364 that includes at least a portion of the target region 314 and the intermediate region 344 between the vehicle 300 and the target region 314.

In some examples, the method 400 may also involve adjusting a viewing direction of the first sensor such that a field-of-view of the first sensor includes the at least portion of the target region. For instance, referring back to FIG. 3B, if the first sensor is initially directed towards a direction other than the direction associated with contour 364, a system of the method 400 may operate the first sensor to adjust the viewing direction of the first sensor such that the first sensor is scanning the portion of the environment associated with contour 364. In this instance, the first sensor may be mounted to a rotating platform, similarly to the LIDAR devices 120 and 122 of the vehicle 100, and a system of the method 400 may operate an actuator to rotate the first sensor to have the viewing direction associated with contour 364.

At block 406, the method 400 involves determining whether a second sensor has a sufficiently clear view of the target region to monitor the target region for presence of moving objects. In some instances, the determination at block 406 may be based on at least the scan obtained by the first sensor at block 404.

In some examples, determining whether the second sensor has a sufficiently clear view of the target region at block 406 may involve determining, based on the scan obtained by the first sensor at block 404, whether a view of the target region by the second sensor is occluded by one or more objects in the intermediate region of the environment. For example, referring back to FIG. 3B, the scan of the portion of the environment indicated by contour 364 may indicate that the second sensor associated with arrows 382a and 382b is not occluded from viewing the target region 314 due to objects in the intermediate region 344 (e.g., debris, trees, other vehicles, street signs, bright light sources, wireless signal towers, reflective objects, etc.).

In some examples, determining whether the second sensor has a sufficiently clear view of the target region at block 406 may involve determining, based on the scan obtained by the first sensor at block 404, whether a view of the target region by the second sensor is occluded by one or more objects in the target region of the environment. For example, referring back to FIG. 3B, the scan of the portion of the environment indicated by contour 364 may indicate that the second sensor associated with arrows 382a and 382b is not occluded from viewing the target region 314 due to objects in the target region 314 (e.g., debris, other vehicles, street signs, bright light sources, reflective objects, etc.).

In some examples, determining whether the second sensor has a sufficiently clear view of the target region at block 406 is also based on a scan of the environment obtained by the second sensor. For instance, a system of the method 400 may identify features (e.g., moving objects, stationary objects, vehicles, trees, etc.) of the environment based on the scan obtained by the first sensor at block 404. The features may be included within or near the target region, for example. In this instance, the system may then determine whether the scan of the environment obtained by the second sensor also indicates the identified features. Thus, in this instance, the system may decide that the second sensor has a sufficiently clear view of the target region based on at least the scan obtained by the second sensor also indicating presence of the identified features.

In some examples, the method 400 may also involve operating the first sensor to obtain a second scan of the portion of the environment that includes the at least portion of the target region. In these examples, determining whether the second sensor has a sufficiently clear view of the target region at block 406 is also based on the second scan.

In a first example, operating the first sensor to obtain the second scan may be in response to passage of a predetermined amount of time after the first scan obtained at block 404. For instance, referring back to FIG. 3B, a system of the method 400 may initially determine at block 406 that the second sensor associated with arrows 382a and 382b has a sufficiently clear view of the target region 314. However, in this instance, the target region 314 may become occluded to the second sensor after the initial determination was made (e.g., a car may move into the intermediate region 344, background radiation that interferes with the second sensor may become present, etc.). Thus, in this instance, after passage of the predetermined amount of time, a system of the method 400 may obtain the second scan to determine whether the second sensor still has the sufficiently clear view of the target region 314. In one embodiment, the predetermined amount of time may be four seconds. However, in other embodiments, the predetermined amount of time may be different. For instance, the predetermined amount of time may vary based on the environment of the autonomous vehicle, the operation being performed by the autonomous vehicle (e.g., lower amount of time for maneuvers that involve a high-speed road than amount of time for maneuvers that involve a slow-speed road, etc.), or any other factor.

In a second example, operating the first sensor to obtain the second scan may be in response to a determination that a vehicle of the method 400 moved at least a threshold distance after the first scan (e.g., at block 404) was obtained by the first sensor. For instance, referring back to FIG. 3B, if the vehicle 300 moves a threshold distance after the first scan indicated by contour 364, the intermediate region 344 between the second sensor and the target region 314 may change. In this instance, occlusions that were previously undetected based on the first scan may be present in the changed intermediate region. Accordingly, in some embodiments, the method 400 may also involve determining that a change in a position of a vehicle after the first sensor obtained the first scan at block 404 is greater than a threshold, and responsively operating the first sensor to obtain the second scan. In one embodiment, the threshold change in position of the vehicle is one meter. However, other threshold changes in the position are possible as well depending on various factors such as the type (or FOV) of the first sensor and/or the second sensor, the environment of the vehicle, etc.

In a third example, operating the first sensor to obtain the second scan may be in response to a determination that the first sensor has completed scanning one or more portions of the environment associated with one or more target regions. For instance, referring back to FIG. 3B, the vehicle 300 may have identified multiple target regions 310, 312, and 314. In this instance, the method 400 at block 404 may involve operating the first sensor to obtain the first scan associated with contour 364 (and target region 314), and adjusting the viewing direction of the first sensor to obtain a scan of the other portion of the environment associated with contour 366 (and target regions 310 or 312). Next, in this instance, the method 400 may then determine that the first sensor completed scans for clearing occlusions associated with all three target regions 310, 312, 314, and may thereby re-adjust the viewing direction of the first sensor to obtain the second scan of the portion of the environment associated with contour 364 (and target region 314). Thus, in this instance, the vehicle 300 may verify whether the second sensor still has a sufficiently clear view of the target region 314 after the first sensor completes performing other scans to clear occlusions associated with other target regions and/or other sensors.

In some examples, determining whether the second sensor has a sufficiently clear view of the target region at block 406 is also based on a determination that a speed of a vehicle of the method 400 is less than a threshold speed. For instance, referring back to FIG. 3B, if the vehicle 300 is moving at a speed higher than the threshold speed, the intermediate region 344 between the target region 314 and the second sensor may change rapidly. As a result, in this instance, new occlusions may become present after the scan of the portion of the environment (e.g., contour 364) was obtained by the first sensor at block 404. Thus, on one hand, the method 400 in this instance may determine that the second sensor does not have a sufficiently clear view of the target region 314 based on at least a determination that the vehicle 300 is moving at a speed higher than the threshold speed. On the other hand, the method 400 in this instance may determine that the second sensor has a sufficiently clear view of the target region 314 based on at least a determination that the vehicle 300 is moving at a speed lower than the threshold speed. In one embodiment, the threshold speed is 0.1 meters per second. However, other threshold speeds are possible as well. For instance, the threshold speed may depend on various factors such as the configuration (e.g., type, resolution, FOV, etc.) of the second sensor, or the average speed of objects in the environment, among other possibilities.

At block 408, the method 400 involves operating the second sensor to monitor the target region for presence of moving objects based on at least a determination that the second sensor has a sufficiently clear view of the target region. For example, referring back to FIG. 3B, where the second sensor is associated with the portion of the environment indicated by arrows 382a and 382b, the second sensor may be assigned to monitor the target region 314 based on the determination (e.g., at block 406, etc.) that the second sensor is not occluded from viewing the target region 314.

In some examples, the method 400 may also involve determining electromagnetic interference in the environment based on data from the second sensor. In these examples, operating the second sensor to monitor the target region at block 408 may be also based on a determination that the electromagnetic interference is less than a threshold. For instance, the second sensor may be a RADAR sensor and the data from the RADAR sensor may indicate the electromagnetic interference (e.g., from another RADAR sensor mounted on another vehicle, from background noise in the environment, signal-to-noise ratio, etc.). In this instance, the electromagnetic interference may affect the reliability of a system of the method 400 in detecting moving objects in the target region based on data from the second sensor. Thus, in this instance, the method 400 may involve operating the second sensor to monitor the target region at block 408 based also on an evaluation of the electromagnetic interference detected by the second sensor. In some embodiments, a system of the method 400 may be configured to operate the second sensor to passively listen to radiation sources and/or noises (i.e., the electromagnetic interference) in the environment. Additionally or alternatively, in some embodiments, a system of the method 400 may be configured to detect the electromagnetic interference based on data from the second sensor while the second sensor is actively scanning the environment.

In some examples, the method 400 may also involve operating another sensor to monitor the target region for presence of moving objects based on at least a determination that the second sensor does not have a sufficiently clear view of the target region. For instance, referring back to FIG. 3B, if the method 400 determines that the second sensor associated with the arrows 382a and 382b does not have a sufficiently clear view of the target region 314 (e.g., due to interference from background radiation, obstructing objects along the line-of-sight of the second sensor, reflecting objects in the environment, etc.), the method 400 may then assign another sensor to monitor the target region.

In a first example, the other sensor may be the first sensor itself. For instance, continuing with the example above, the method 400 may assign the first sensor associated with contour 364 to continue scanning portions of the environment 302 that include at least a portion of the target region 314. In this instance, the vehicle 300 may continue to use the first sensor to monitor the target region 314 while the vehicle 300 is performing the left turn maneuver indicated by arrow 308 of FIG. 3A. Alternatively, in this instance, the vehicle 300 may continue operating the first sensor to monitor the target region 314 until the second sensor (or any other sensor) has a sufficiently clear view of the target region 314. For instance, where the occlusion is due to another vehicle along the line-of-sight of the second sensor (e.g., within intermediate region 344 or target region 314), the first sensor may continue to monitor the target region 314 until the other vehicle moves out of the line-of-sight of the second sensor.

In a second example, the other sensor may be a third sensor other than the first sensor and the second sensor. For instance, the system of the method 400 may include other sensors having FOVs that overlap with the target region. Referring back to FIG. 1E by way of example, a system of the method 400 may utilize any of the LIDAR sensors associated with contours 162, 166, etc., to monitor the target region. As another example, referring back to FIG. 2, a system of the method 400 may identify any of the sensors in the sensor system 204 (other than the first sensor and the second sensor), such as a camera, etc., that also has a FOV overlapping with the target region. As yet another example, referring back to FIG. 3B, the vehicle 300 may determine that the second sensor associated with arrows 382a-382b does not have a sufficiently clear view of the target regions 310 or 312 (e.g., due to positioning of the second sensor, etc.). In this example, the method 400 may then determine whether a third sensor associated with arrows 384a-384b (or any other sensor) has a sufficiently clear view of the target regions 310 or 312, and may then assign the third sensor to monitor the respective target regions, for example. Accordingly, in some embodiments, the method 400 may also involve determining whether a third sensor has a sufficiently clear view of the target region, and operating the third sensor to monitor the target region for presence of moving objects based on the determination.

In some examples, the method 400 may also involve identifying a second target region of the environment to be monitored for presence of moving objects, operating the first sensor to obtain a scan of a second portion of the environment that includes at least a portion of the second target region, and selecting a particular sensor to monitor the second target region based on at least the scan of the second portion of the environment obtained by the first sensor. For instance, referring back to FIG. 3B, the vehicle 300 may obtain the first scan associated with contour 364, and assign the second sensor associated with arrows 382a-382b to monitor the target region 314. Next, in this instance, the vehicle 300 may adjust the viewing direction of the first sensor towards the second target region 312, and obtain the second scan of the second portion of the environment that includes the second target region 312. Next, in this instance, the vehicle 300 may select the particular sensor associated with arrows 384a-384b to monitor the second target region 312 based on at least a determination that the particular sensor has a sufficiently clear view of the second target region 312, in line with the discussion above.

Figure 5:
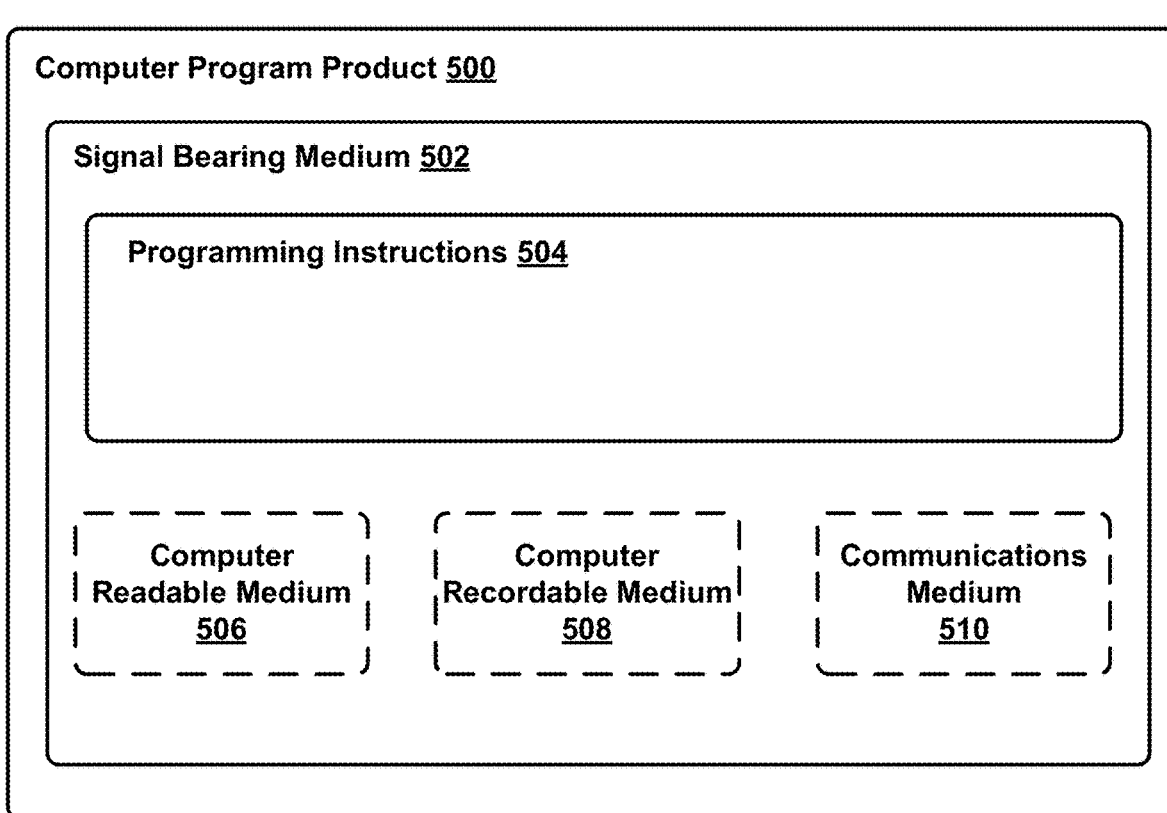
FIG. 5 depicts a computer readable medium configured according to an example embodiment.

FIG. 5 depicts a computer readable medium configured according to an example embodiment. In some embodiments, an example system may include one or more processors, one or more forms of memory, one or more input devices/interfaces, one or more output devices/interfaces, and machine readable instructions that when executed by the one or more processors cause the system to carry out the various functions, tasks, capabilities, etc., described above.

As noted above, in some embodiments, the disclosed techniques (e.g., method 400, etc.) may be implemented by computer program instructions encoded on a computer readable storage media in a machine-readable format, or on other media or articles of manufacture (e.g., instructions 216 of the vehicle 200, etc.). FIG. 5 is a schematic illustrating a conceptual partial view of an example computer program product that includes a computer program for executing a computer process on a computing device, arranged according to at least some embodiments disclosed herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may be a non-transitory computer-readable medium 506, such as, but not limited to, a hard disk drive, a Compact Disc (CD), a Digital Video Disk (DVD), a digital tape, memory, etc. In some implementations, the signal bearing medium 502 may be a computer recordable medium 508, such as, but not limited to, memory, read/write (R/W) CDs, R/W DVDs, etc. In some implementations, the signal bearing medium 502 may be a communication medium 510 (e.g., a fiber optic cable, a waveguide, a wired communications link, etc.). Thus, for example, the signal bearing medium 502 may be conveyed by a wireless form of the communications medium 510.

The one or more programming instructions 504 may be, for example, computer executable and/or logic implemented instructions. In some examples, a computing device may be configured to provide various operations, functions, or actions in response to the programming instructions 504 conveyed to the computing device by one or more of the computer readable medium 506, the computer recordable medium 508, and/or the communications medium 510.

The computer readable medium 506 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

V. Conclusion

Within examples, systems, devices and methods herein may allow clearing occlusions for a sensor with respect to a target region of an environment and evaluating whether the sensor is able to monitor the target region for presence of moving objects. In one example, a method is provided that involves determining whether a sensor has a sufficiently clear view of a target region based on at least a scan of an environment obtained by another sensor. Further, exemplary embodiments herein may involve evaluation of various factors to determine whether the sensor has a sufficiently clear view of the target region, such as presence of objects along a line-of-sight of the sensor, presence of objects within the target region, presence of reflective objects near or within the target region, background noise in the environment, and/or interference from other transmitters/sensors in the environment, among other possibilities. Further, exemplary embodiments herein may involve assigning a particular sensor to monitor one or more particular target regions of the environment based on at least a determination of whether the particular sensor is suitable for monitoring the one or more particular target regions for presence of moving objects.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining a navigational maneuver to be performed by a vehicle;
   identifying a target region of an environment of the vehicle to be monitored for presence of moving objects based on the navigational maneuver to be performed by the vehicle, wherein the vehicle includes a plurality of sensors;
   causing a first sensor of the plurality of sensors to scan a portion of the environment associated with the target region;
   selecting one of the plurality of sensors for monitoring the target region, wherein selecting one of the plurality of sensors for monitoring the target region comprises:
      determining, based on at least the scan by the first sensor, that the selected one of the plurality of sensors has a sufficiently clear view of the target region; and
   causing the selected one of the plurality of sensors to monitor the target region for presence of moving objects.

2. The method of claim 1, wherein the portion of the environment scanned by the first sensor includes an intermediate region between the vehicle and the target region, and wherein determining, based on at least the scan by the first sensor, that the selected one of the plurality of sensors has a sufficiently clear view of the target region comprises:
   determining, based on at least the scan by the first sensor, that the selected one of the plurality of sensors is not occluded by one or more objects in the intermediate region.

3. The method of claim 1, wherein the portion of the environment scanned by the first sensor includes at least a portion of the target region, and wherein determining, based on at least the scan by the first sensor, that the selected one of the plurality of sensors has a sufficiently clear view of the target region comprises:
   determining, based on at least the scan by the first sensor, that the selected one of the plurality of sensors is not occluded by one or more objects in the target region.

4. The method of claim 1, wherein the portion of the environment scanned by the first sensor includes one or more regions of the environment adjacent to the target region, and wherein selecting one of the plurality of sensors for monitoring the target region is further based on at least the scan of the one or more regions by the first sensor.

5. The method of claim 1, further comprising:
   adjusting the portion of the environment scanned by the first sensor based on at least a field-of-view (FOV) of a second sensor of the plurality of sensors.

6. The method of claim 1, wherein selecting one of the plurality of sensors for monitoring the target region is further based on the selected one of the plurality of sensors having a field-of-view (FOV) that at least partially overlaps with the target region.

7. The method of claim 1, wherein selecting one of the plurality of sensors for monitoring the target region is further based on a mounting position of the selected one of the plurality of sensors in the vehicle.

8. The method of claim 1, wherein selecting one of the plurality of sensors comprises selecting a second sensor of the plurality of sensors, and wherein selecting the second sensor is further based on a scan of the environment by the second sensor.

9. The method of claim 1, wherein the scan by the first sensor is a first scan, wherein selecting one of the plurality of sensors comprises selecting a second sensor of the plurality of sensors, the method further comprising:
   while the second sensor is monitoring the target region for presence of moving objects, causing the first sensor to obtain a second scan associated with the target region.

10. The method of claim 8, further comprising:
    based on at least the second scan, selecting another sensor of the plurality of sensors for monitoring the target region; and
    causing the selected another sensor to monitor the target region for presence of moving objects.

11. The method of claim 8, wherein causing the first sensor to obtain the second scan is in response to passage of at least a threshold amount of time after the first scan.

12. The method of claim 8, wherein causing the first sensor to obtain the second scan is in response to the vehicle moving at least a threshold distance after the first sensor obtains the first scan.

13. The method of claim 1, wherein the target region is a first target region, wherein the selected one of the plurality of sensors is a second sensor of the plurality of sensors, the method further comprising:

identifying a second target region of the environment to be monitored for presence of moving objects;

causing the first sensor to scan a second portion of the environment associated with the second target region;

selecting, based on at least the scan of the second portion of the environment by the first sensor, another sensor of the plurality of sensors for monitoring the second target region; and while the second sensor is monitoring the first target region, causing the selected another sensor to monitor the second target region for presence of moving objects.

14. The method of claim 1, wherein causing the selected one of the plurality of sensors to monitor the target region for presence of moving objects comprises:

detecting moving objects in the target region based on data from the selected one of the plurality of sensors.

15. The method of claim 1, further comprising:

causing the vehicle to perform the navigational maneuver, wherein causing the selected one of the plurality of sensors to monitor the target region for presence of moving objects comprises:

using the selected one of the plurality of sensors to obtain one or more scans of the target region while the vehicle is performing the navigational maneuver.

16. The method of claim 1, further comprising:

causing the vehicle to perform the navigational maneuver, wherein causing the selected one of the plurality of sensors to monitor the target region for presence of moving objects comprises:

using the selected one of the plurality of sensors to obtain one or more scans of the target region prior to the vehicle performing the navigational maneuver.

17. The method of claim 1, further comprising:

detecting an object in the target region; and identifying the object as a moving object.

18. The method of claim 17, wherein identifying the object as the moving object is based on the object being detected using the one of the plurality of sensors selected for monitoring the target region.

19. The method of claim 1, wherein the navigational maneuver to be performed by the vehicle comprises at least one of a left turn, a right turn, a U-turn, a lane change, crossing an intersection, merging, pulling out of a driveway, or backing up.

20. A system comprising:

a plurality of sensors configured to scan respective portions of an environment of a vehicle;

one or more processors; and data storage storing instructions that, when executed by the one or more processors, cause the system to perform operations comprising:

determining a navigational maneuver to be performed by the vehicle;

identifying a target region of the environment to be monitored for presence of moving objects based on the navigational maneuver to be performed by the vehicle;

using a first sensor of the plurality of sensors to scan a portion of the environment associated with the target region;

selecting one of the plurality of sensors for monitoring the target region, wherein selecting one of the plurality of sensors for monitoring the target region comprises:

determining, based on at least the scan by the first sensor, that the selected one of the plurality of sensors has a sufficiently clear view of the target region; and using the selected one of the plurality of sensors to monitor the target region for presence of moving objects.

21. The system of claim 20, wherein the first sensor is a light detection and ranging (LIDAR) sensor, and wherein the selected one of the plurality of sensors is a radio detection and ranging (RADAR) sensor.

22. The system of claim 21, wherein the LIDAR sensor is mounted on a top side of the vehicle, and wherein the RADAR sensor is mounted on a side of the vehicle other than the top side.

23. A non-transitory computer readable medium having stored therein instructions, that when executed by a computing device, cause the computing device to perform operations comprising:

determining a navigational maneuver to be performed by a vehicle;

identifying a target region of an environment of the vehicle to be monitored for presence of moving objects based on the navigational maneuver to be performed by the vehicle, wherein the vehicle includes a plurality of sensors;

operating a first sensor of the plurality of sensors to obtain a scan of a portion of the environment associated with the target region;

selecting one of the plurality of sensors for monitoring the target region, wherein selecting one of the plurality of sensors for monitoring the target region comprises:

determining, based on at least the scan by the first sensor, that the selected one of the plurality of sensors has a sufficiently clear view of the target region; and operating the selected one of the plurality of sensors to monitor the target region for presence of moving objects.

24. The non-transitory computer readable medium of claim 23, wherein the portion of the environment scanned by the first sensor includes an intermediate region between the vehicle and the target region.

* * * * *